(12) United States Patent
Joo et al.

(10) Patent No.: US 11,416,343 B2
(45) Date of Patent: *Aug. 16, 2022

(54) CLASSIFYING SNAPSHOT IMAGE PROCESSING

(71) Applicant: Rubrik, Inc., Palo Alto, CA (US)

(72) Inventors: Jonathan Youngha Joo, Mountain View, CA (US); Adam Gee, San Francisco, CA (US); Vivek Sanjay Jain, Palo Alto, CA (US); Junyong Lee, Menlo Park, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/071,267

(22) Filed: Oct. 15, 2020

(65) Prior Publication Data

US 2021/0165715 A1 Jun. 3, 2021

Related U.S. Application Data

(63) Continuation of application No. 16/528,360, filed on Jul. 31, 2019, now Pat. No. 10,838,817.

(51) Int. Cl.
*G06F 11/14* (2006.01)
*G06F 3/06* (2006.01)

(52) U.S. Cl.
CPC ........ *G06F 11/1435* (2013.01); *G06F 3/0614* (2013.01); *G06F 3/0641* (2013.01); *G06F 3/0673* (2013.01); *G06F 11/1451* (2013.01); *G06F 11/1458* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 9,697,268 B1 * | 7/2017 | Prater | G06F 16/27 |
| 10,838,817 B1 | 11/2020 | Joo et al. | |
| 2014/0012940 A1 * | 1/2014 | Joshi | G06F 9/45558 709/214 |
| 2014/0181027 A1 | 6/2014 | Whitehead et al. | |
| 2016/0124977 A1 * | 5/2016 | Jain | G06F 16/84 707/649 |
| 2018/0121454 A1 * | 5/2018 | Kushwah | G06F 16/13 |
| 2020/0104259 A1 * | 4/2020 | Wang | G06F 12/0842 |

* cited by examiner

*Primary Examiner* — Edward J Dudek, Jr.
*Assistant Examiner* — Ralph A Verderamo, III
(74) *Attorney, Agent, or Firm* — Holland & Hart LLP

(57) ABSTRACT

Systems, methods, and machine-storage medium for classifying snapshot image processing are described. The system receives read requests to read snapshot information. Each read request includes an offset identifying a storage location and a length. The snapshot information includes snapshots including a full snapshot and at least one incremental snapshot. The read requests include a first read request to read data from the snapshot information. The system generates a first plurality of read events including a second plurality of read events that are generated by processing the first read request. The second plurality of read events includes first and a second read events. The system identifies whether utilizing a cache optimizes the job based on the first plurality of read events.

20 Claims, 27 Drawing Sheets

FIG. 2A

OFFSET=2, LENGTH=15

```
XXXXXXXXXXXXXXX
0123456789012345678 90
          1111111111222
```

230

SNAPSHOT INFORMATION 122

I-3:
```
          KIWI
01234567890123456789 0
         1111111111 2
```

I-2:
```
          PEACHES
01234567890123456789 0
         1111111111 2
```

I-1:
```
          APRICOTS
01234567890123456789 0
         1111111111 2
```

F-0:
```
APPLE ORANGE BANANA PEACHES
01234567890123456789 0
         1111111111 2
```

CACHED SNAPSHOT INFORMATION 124

```
01234567890123456789012 3
         1111111111222 3
```

(four rows, labels 210, 210, 210, 208)

CLASSIFYING SNAPSHOT IMAGE PROCESSING

CLAIM OF PRIORITY

This Application is a continuation of and claims the benefit of priority to U.S. application Ser. No. 16/528,360, filed Jul. 31, 2019, which is hereby incorporated by reference in its entirety.

TECHNICAL FIELD

This disclosure relates to the technical field of data processing and more particularly to classifying snapshot image processing.

BACKGROUND

Images of subjects in a database may be stored over time as a sequence snapshot images. Jobs may be executed that utilize the sequence snapshot images to produce output. Different jobs access the sequence of snapshot images in different ways to produce different output.

BRIEF DESCRIPTION OF THE DRAWINGS

FIG. 2A is a block diagram illustrating an example, according to an embodiment;

FIG. 2C is a block diagram illustrating an example, according to an embodiment;

FIG. 2D is a block diagram illustrating an example, according to an embodiment;

DETAILED DESCRIPTION

Figure 1A:
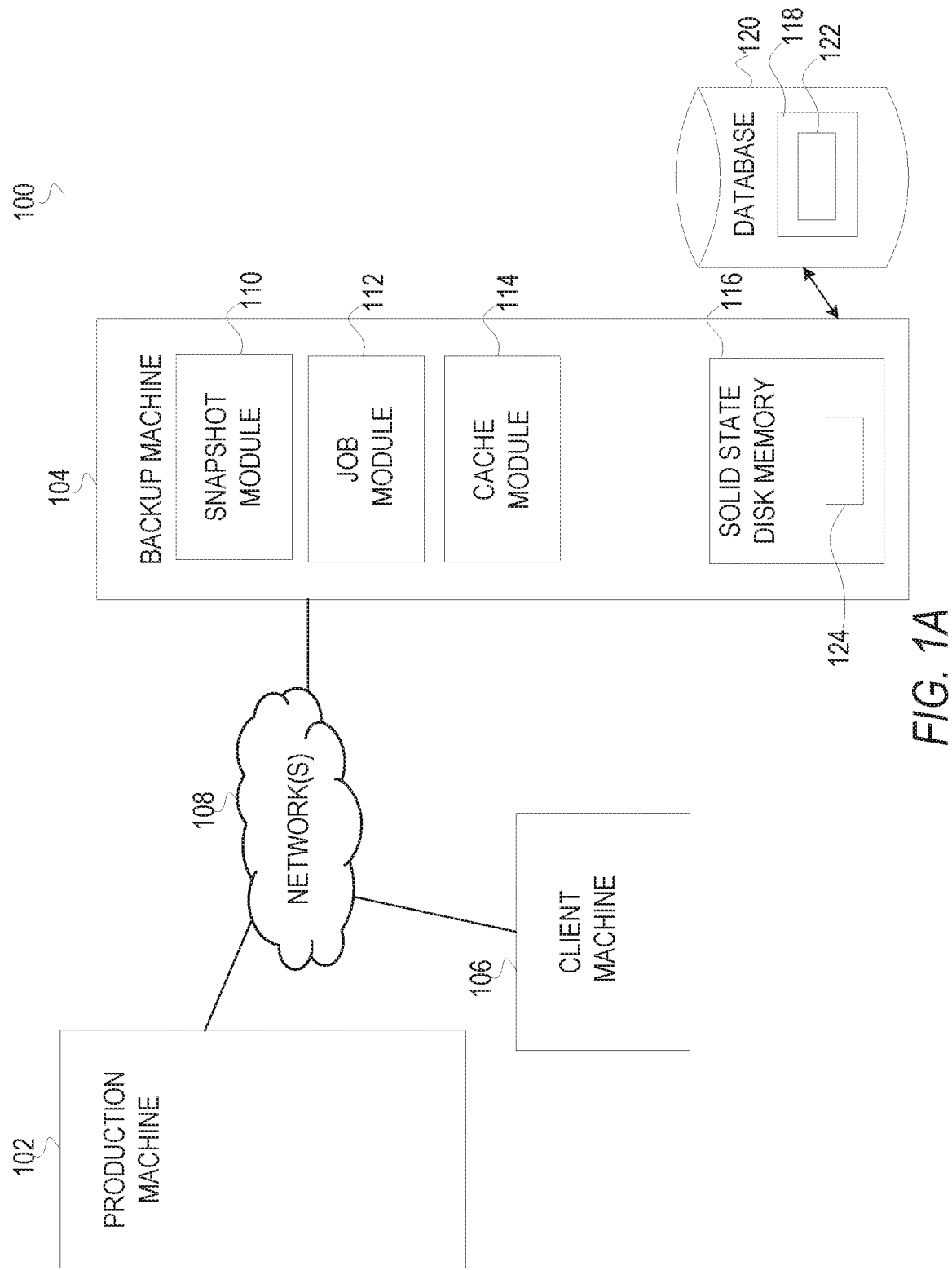
FIG. 1A is a block diagram illustrating a system, according to an embodiment.

FIG. 1A is a block diagram illustrating a system 100, according to an embodiment. The system 100 provides a technical solution to a technical problem. The technical problem is how to optimize a job that retrieves data from snapshot information including a set of snapshots of one or more subjects hosted by a production machine where the set of snapshots includes a full snapshot and at least one incremental snapshot; and where the full snapshot is an image of a subject (e.g., virtual machine) on the production machine (e.g., logical address space); and where the image of the subject on the production machine comprises a range of storage locations (e.g., logical address space); where each of the incremental snapshots registers subsequent changes to the image over a period of time; and where the job is repeatedly performed and has a workload characterized by: 1) semi-repeatable random input/output I/O; and where 2) the changes, but at a fairly slow rate.

The technical solution to the technical problem is to provide a cache that is organized in levels that correspond to the snapshots where a read from a snapshot in a level causes a write to a cached snapshot that is stored in a cache in the same level; and where a subsequent read of the same location is optimized because the data is retrieved from the cache in solid state disk memory rather than hard disk drive storage leading to improved performance overall. Accordingly, the initialized cache may be reused each time the job is executed on the snapshot information and its pedigree. The technical solution may be embodied in system 100. Multiple real world examples are set out below.

System 100 includes a production machine 102, a backup machine 104, and a client machine 106 that communicate over one or more networks 108 (e.g., Internet). The backup machine 104 may include a snapshot module 110, a job module 112, a cache module 114, a solid state disk memory 116 (e.g., solid-state drive (SSD)). The backup machine 104 is communicatively coupled to a database 120 including hard disk drive storage 118 (e.g., hard disk drive (HDD)). The system 100 may be implemented in a networked computing environment where the production machine 102, the backup machine 104, and the client machine 106 are interconnected through one or more networks 108. According to one embodiment, the system 100 may be implemented as a single software platform that delivers backup, instant recovery, archival, search, analytics, compliance, and copy data management in one secure fabric across data centers and clouds as offered by Rubrik Inc., of Palo Alto, Calif.

The snapshot module 110 takes snapshots of images of one or more subjects on the production machine 102 and stores the snapshots as snapshot information 122 in hard disk drive storage 118 in the database 120. For example, the snapshot module 110 may periodically take snapshots of images of one or more virtual machines that are hosted by the production machine 102 and respectively read from a range of storage locations (e.g., logic address space) on the production machine 102.

Each snapshot may be a full snapshot or an incremental snapshot. The full snapshot captures an image of a subject (e.g., virtual machine) at an initial time by reading from a range of storage locations on the production machine and storing the image on the database 120. The incremental snapshots capture one or more changes to the image during consecutive periods of time each including a start time and an end time. Accordingly, the full snapshot may be combined with the one or more incremental snapshots to reconstruct an image of a subject (e.g., virtual machine) at a time associated with one of the incremental snapshots.

The job module 112 includes jobs that may be executed on demand or periodically to process the snapshot information 122. For example, the job module 112 may include an indexing job that is utilized to process snapshot information 122 for virtual machines to generate virtual machine search indexes, as described later in this document. The indexing job may exhibit a workload characterized by: 1) semi-repeatable random input/output I/O; and where 2) the I/O changes, but at a fairly slow rate. Other jobs may not exhibit this type of workload and may not benefit from the technical solution described in this document. The snapshot information 122 for a particular virtual machine and a particular period of time may include a full snapshot and one or more incremental snapshots. The job module 112 processes the snapshot information 122 by sending requests to the cache module 114 that cause the cache module 114 to read data from the snapshot information 122. Each read request includes a location and an offset. The location and the offset combine to form a range that identifies one or more storage locations in the logical address space that identifies the data being requested. The job module 112 receives responses from the cache module 114 respectively including the data requested.

The cache module 114 receives requests to read data (e.g., read requests) from the job module 112, retrieves the data from optimized snapshot information (e.g., snapshot information 122 and cached snapshot information 124), and responds by communicating the requested data back to the job module 112. Each read request includes an offset and a length. The cache module 114 utilizes the offset and the length to identify whether the data is being stored as cached snapshot information 124 in the solid state disk memory 116 or as snapshot information 122 in the hard disk drive storage 118. The cache is organized according to levels in accordance with the snapshots. Accordingly, the cache module 114 reads the data from the optimized snapshot information by zig-zagging down through the levels of snapshots (moving from later time to earlier time) to identify the most recent data that is being stored in the requested range of locations. For example, at each level, the cache module 114 first identifies whether the data is stored in the cached snapshot information 124 in the solid state disk memory 116. Responsive to not identifying the data is being stored in the solid state disk memory 116, then the cache module 114 identifies whether the data is stored in the snapshot information 122 in the hard disk drive storage 118 at the current level. The cache module 114 iterates the above process descending down through the levels until the full snapshot is reached where it identifies any portions of data not previously identified in the upper levels. If the cache module 114 identifies any portion of the data being located in the snapshot information 122 of a particular level, then the cache module 114 writes the portion of the data to the cached snapshot information 124 associated with the current level and communicates the data to the job module 112. This operation is more fully described later in this document.

The client machine 106 may be utilized to execute jobs, take snapshots (e.g., scheduled, requested, etc.), configure parameters, and perform administrative operations, and the like. The client machine 106 may include a desktop computer, a mobile device, or any other device capable of receiving and communicating commands and selections, as described in this document.

Figure 1B:
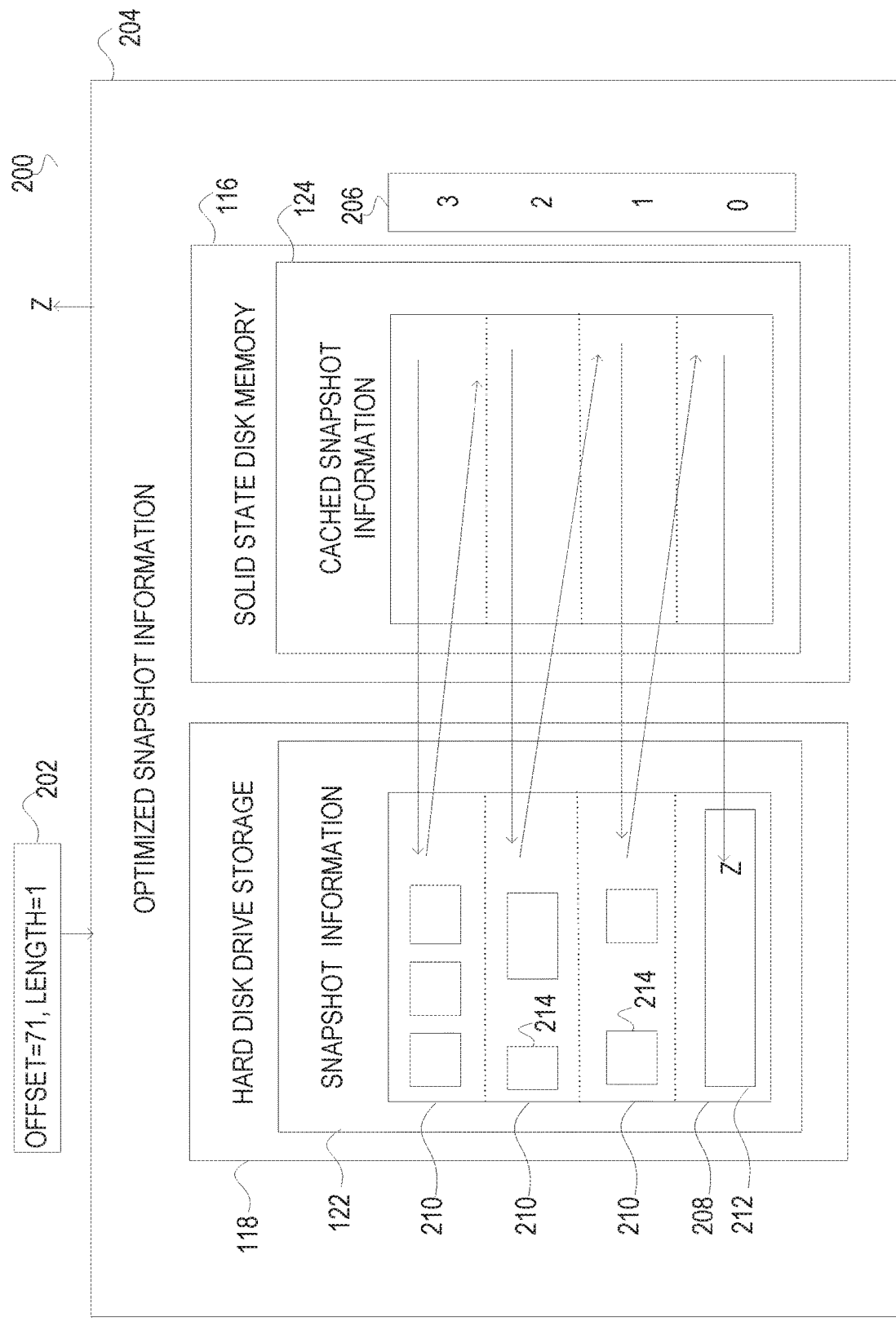
FIG. 1B is a block diagram illustrating an example, according to an embodiment, of zig-zagging optimized snapshot information.

FIG. 1B is a block diagram illustrating an example 200, according to an embodiment, of zig-zagging optimized snapshot information. The example 200 includes a read request 202, optimized snapshot information 204, a solid state disk memory 116, and a hard disk drive storage 118. The read request 202 includes an offset and a length. The offset and the length may be utilized to access a range of storage locations in a logical address space corresponding to a subject (e.g., virtual machine). A base address may be associated with an image of a subject and is utilized to access the storage locations corresponding to the subject on the production machine. A base address of "0" may be utilized to access the storage locations for the image of the subject in a snapshot in the snapshot information 122 or in the corresponding cached snapshot information 124. The read request 202 includes an offset of "71" and a length of "1." A base address of "0" may be added to the offset to access the storage locations for the image of the subject in the hard disk drive storage 118 or the solid state disk memory 116, and a base address associated with an image of the subject is utilized to access the storage locations corresponding to the subject on the production machine.

The optimized snapshot information 204 includes snapshot information 122 and cached snapshot information 124 and is organized according to levels 206 respectively corresponding to the snapshots. For example, the levels 206 are labeled, from top to bottom (e.g., later to earlier), "3," "2," "1" and "0" where each level 206 is associated with a snapshot. The level 206 (e.g., "0"), towards the bottom of optimized snapshot information 204, corresponds to a full snapshot 208. For example, level "0" corresponds to a full snapshot 208 of an image of a subject on the production machine 102 that is taken at a first time. The levels above the bottom level each correspond to incremental snapshots 210. The incremental snapshots 210 include changes to portions of the image of the subject (e.g., virtual machine) on the production machine 102. For example, level "1" corresponds to an incremental snapshot (e.g., first incremental snapshot) including changes written to the image of the subject between a first time and a second time; level "3" corresponds to an incremental snapshot (e.g., third incremental snapshot) including changes written to the image of the subject between the second time and a third time, and so forth. Accordingly, a large rectangle 212 in the full snapshot 208 signifies a snapshot of the entire image of the subject in the production machine, and the small rectangles 214 in the incremental snapshots signify changes written to portions of the image during a segment of time.

The example 200 illustrates a zig-zagging movement of optimized snapshot information 204 and tracing a search for the requested data that is optimally processed (e.g., retrieved). The zig-zagging movement is performed to identify whether any portions of a range of locations stores data that may be retrieved from the solid state disk memory 116 (e.g., faster retrieval) rather than the hard disk drive storage 118 (e.g., slower retrieval). The example 200 illustrates a search for the requested data causing a zig-zagging movement beginning in the cached snapshot information 124 at level "3," proceeding to the snapshot information 122 at level "3" and iterating at each of the levels "2," "1," and "0" until the letter "Z" is found in the snapshot information 122 of the full snapshot 208 at level "0."

Persistence of Cached Snapshot Information

In one embodiment, the cached snapshot information 124 may be stored on the hard disk drive storage 118 to persist the cached snapshot information 124. The cached snapshot information 124 is persisted to enable flushing the solid state disk memory 116. For example, solid state disk memory 116 may be flushed between executions of the job module 112. Accordingly, responsive to execution of a job, the job module 112 may identify, load, store, and utilize the cached snapshot information 124. For example, the job module 112 may identify the cached snapshot information 124 in the hard disk drive storage 118 based on the job; load the cached snapshot information 124 from the hard disk drive storage 118; store the cached snapshot information 124 in the solid state disk memory 116; and execute the job that utilizes the cached snapshot information in the solid state disk memory 116.

FIG. 2A is a block diagram illustrating an example 230, according to an embodiment, of a read request 202. The read request 202 is illustrated in association with snapshot information 122 and cached snapshot information 124. The read request 202 includes a request for data beginning at location 2 for a length of 15. The cached snapshot information 124 is not initialized with data. Accordingly, each read from the snapshot information 122 will cause the cached snapshot information 124 to be initialized with the data that was read from the snapshot information 122. The snapshot information 122 includes a full snapshot 208 (e.g., level "0") initialized with the words, "APPLE," "ORANGE," "BANANA" and "PEACHES; an incremental snapshot 210 (e.g., level "1") (e.g., first incremental snapshot) initialized with the word "APRICOTS;" an incremental snapshot 210 (e.g., level "2") (e.g., second incremental snapshot) initialized with the word "PEACHES;" and an incremental snapshot 210 (e.g., level "3") (e.g., third incremental snapshot) initialized with the word "KWIW." The third incremental snapshot is the most recent snapshot. Accordingly, the cache module 114 searches as follows: step 1—search cached snapshot information 124 (e.g., level "3") to identify nothing; step 2—search snapshot information 122 (e.g., level "3") to identify "KIWI;" step 3—search cached snapshot information 124 (e.g., level "2") to identify nothing; step 4—search snapshot information 122 (e.g., level "2") to identify "PEACH;" step 5—search cached snapshot information 124 (e.g., level "1") to identify nothing; step 6—search snapshot information 122 (e.g., level "1") to identify "AP;" step 7—search cached snapshot information 124 (e.g., level "0") to identify nothing; and step 8—search snapshot information 122 (e.g., level "0") to identify "IDLE" and "A."

Figure 2B:
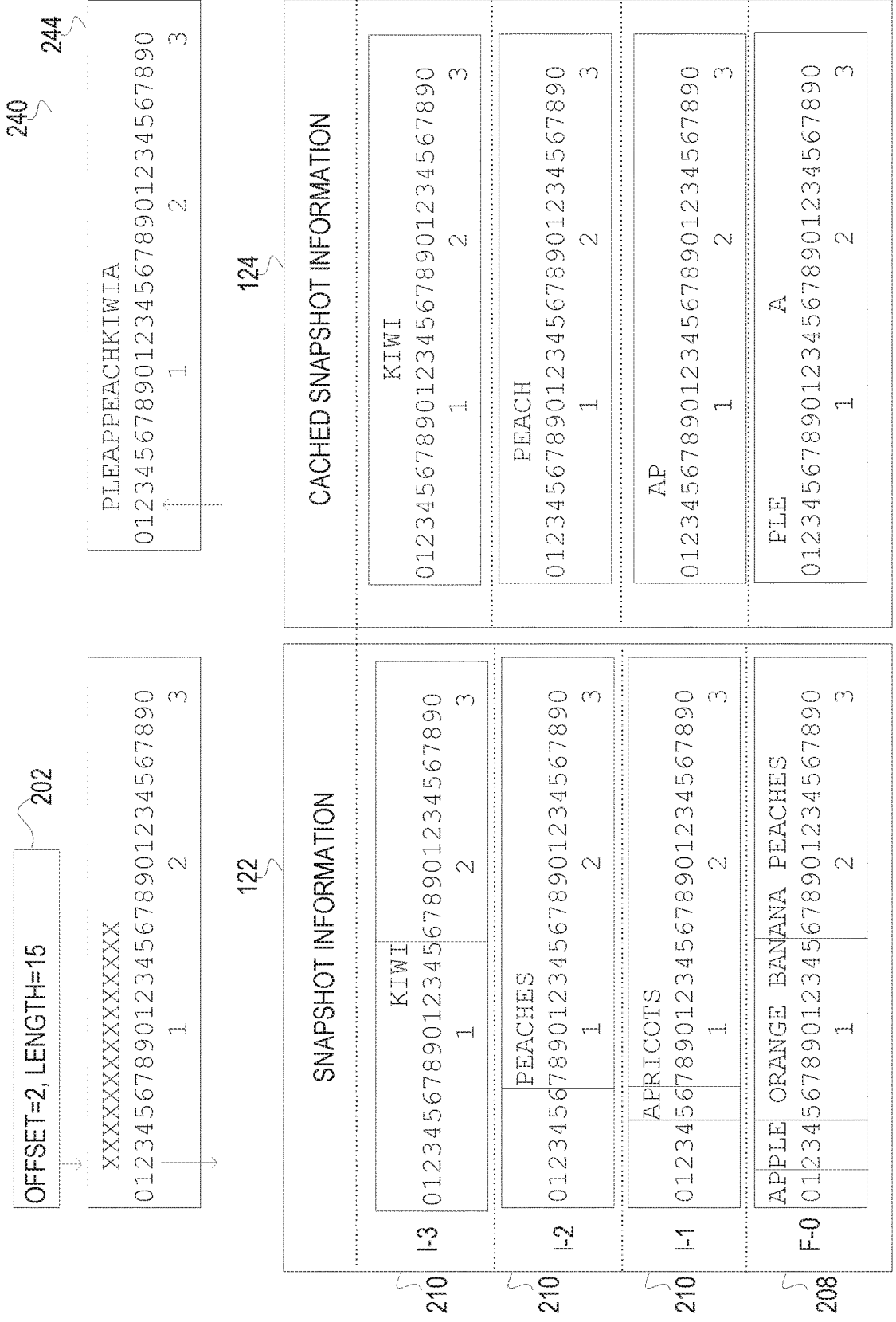
FIG. 2B is a block diagram illustrating an example, according to an embodiment.

FIG. 2B is a block diagram illustrating an example 240, according to an embodiment, of a response 244 to the read request 202. The example 240 illustrates the state of the cached snapshot information after processing the read request 202 based on the cached snapshot information 124, as illustrated in FIG. 2A. The example 240 illustrates the response 244 as including the data, "PLEAPPEACHKI-WIA" and the cached snapshot information 124 as being written with the data "KIWI," at level "3," "PEACH," at level "2," "AP," at level "1," and "PLE" & "A," at level "0."

Figure 2C:
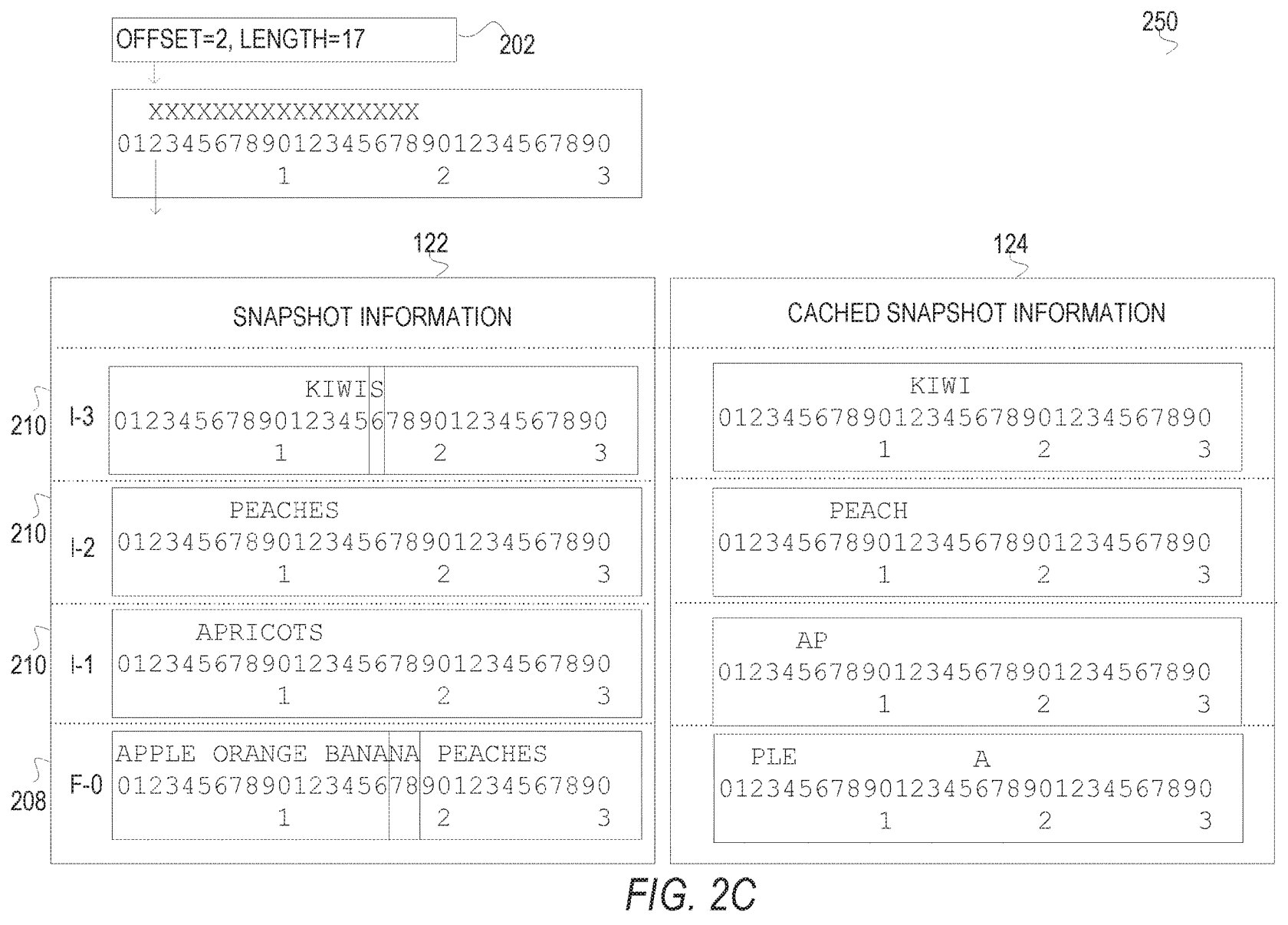

FIG. 2C is a block diagram illustrating an example 250, according to an embodiment, of a read request 202. The read request 202 is illustrated in association with snapshot information 122 and cached snapshot information 124. The read request 202 includes a request for data beginning at offset 2 and for a length of 17. The example 250 includes cached snapshot information 124 that is initialized with the data "KIWI," at level "3," "PEACH," at level 2, "AP," at level "1" and "PLE" "A," at level "0." Accordingly, the data "KIWI," "PEACH," "AP," "PLE" and "A" are retrieved from the cached snapshot information 124 because the data are stored in requested locations. In addition, the data "S," at level "3," and the data. "NA," at level "0," are retrieved from the snapshot information 122 because they are stored in the requested locations in the snapshot information 122 and not stored in the requested locations in the cached snapshot information 124.

Figure 2D:
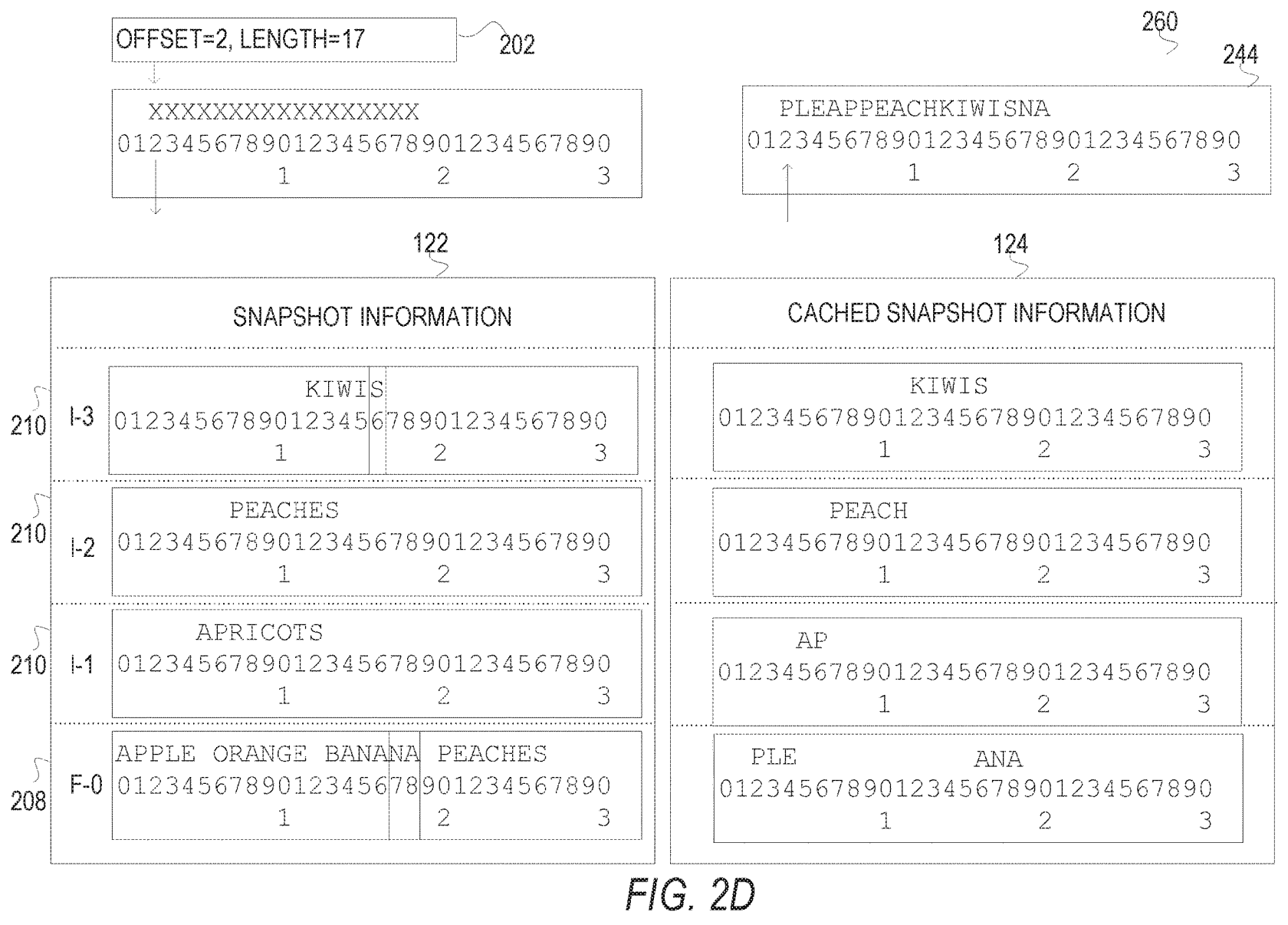

FIG. 2D is a block diagram illustrating an example 260, according to an embodiment, of a response 244 to a read request 202. The example 260 illustrates the state of the cached snapshot information 124 after processing the read request 202, as illustrated in FIG. 2C. The example 260 illustrates the cached snapshot information 124 as being written with the data "S," at level "3," and the data "NA" at level "0" because both data were read from the snapshot information 122 to respond to the read request 202.

Figure 3A:
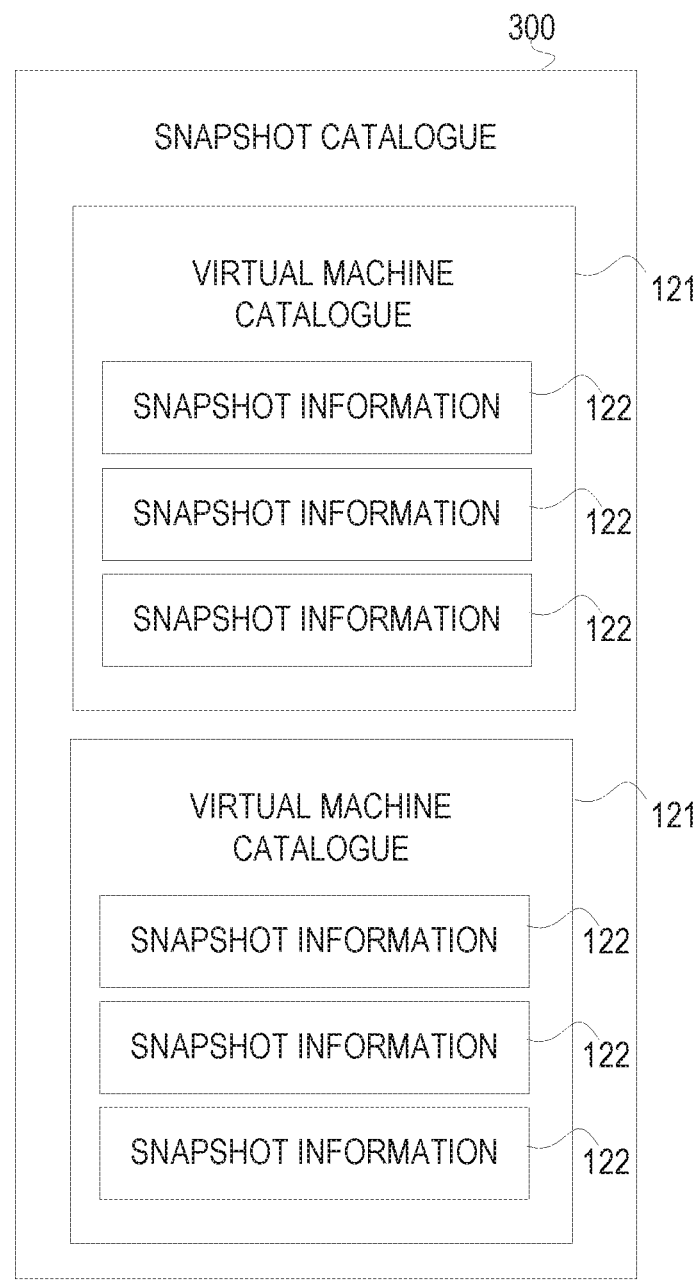
FIG. 3A is a block diagram illustrating a snapshot catalogue, according to an embodiment.

FIG. 3A is a block diagram illustrating a snapshot catalogue 300, according to an embodiment. The snapshot catalogue 300 may be stored in hard disk drive storage 118 in the database 120. The snapshot catalogue 300 may include one or more entries of virtual machine catalogues 121. Each virtual machine catalogue 121 includes one or more entries of snapshot information 122. The snapshot information 122 may be stored in the snapshot catalogue 300 by the snapshot module 110 and read from the snapshot catalogue 300 by the cache module 114.

Figure 3B:
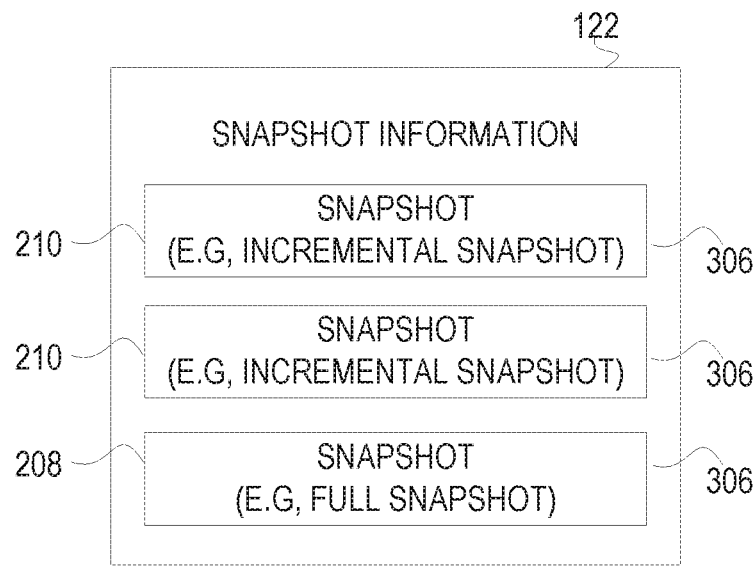
FIG. 3B is a block diagram illustrating snapshot information, according to an embodiment.

FIG. 3B is a block diagram illustrating snapshot information 122, according to an embodiment. The snapshot information 122 may include one or more snapshots 306. A snapshot 306 may be embodied as the incremental snapshot 210 or the full snapshot 208, both as previously described.

Figure 3C:
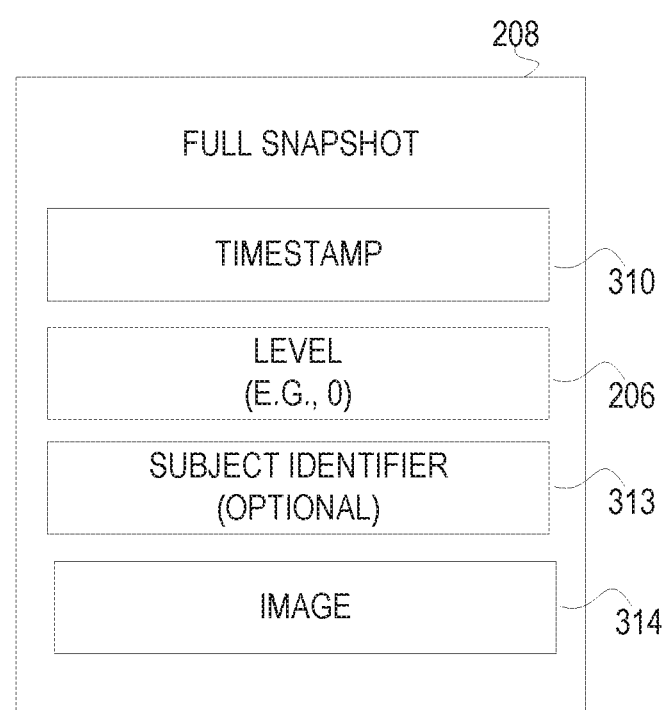
FIG. 3C is a block diagram illustrating a full snapshot, according to an embodiment.

FIG. 3C is a block diagram illustrating a full snapshot 208, according to an embodiment. The full snapshot 208 may include a timestamp 310, a level 206, a subject identifier 313, and an image 314. The timestamp 310 may register the date and time the full snapshot 208 was taken. For example, the timestamp 310 may register the date and time the snapshot module 110 took a full snapshot 208 of a virtual machine at the production machine 102 to generate the image 314. The level 206 was previously described and is "0" for the full snapshot 208. The subject identifier 313 uniquely identifies the subject of the image 314 from other subjects on the production machine 102. For example, the production machine 102 may include multiple virtual machines and the subject identifier 313 identifies the virtual machine that is the subject of the image 314. The image 314 was previously described.

Figure 3D:
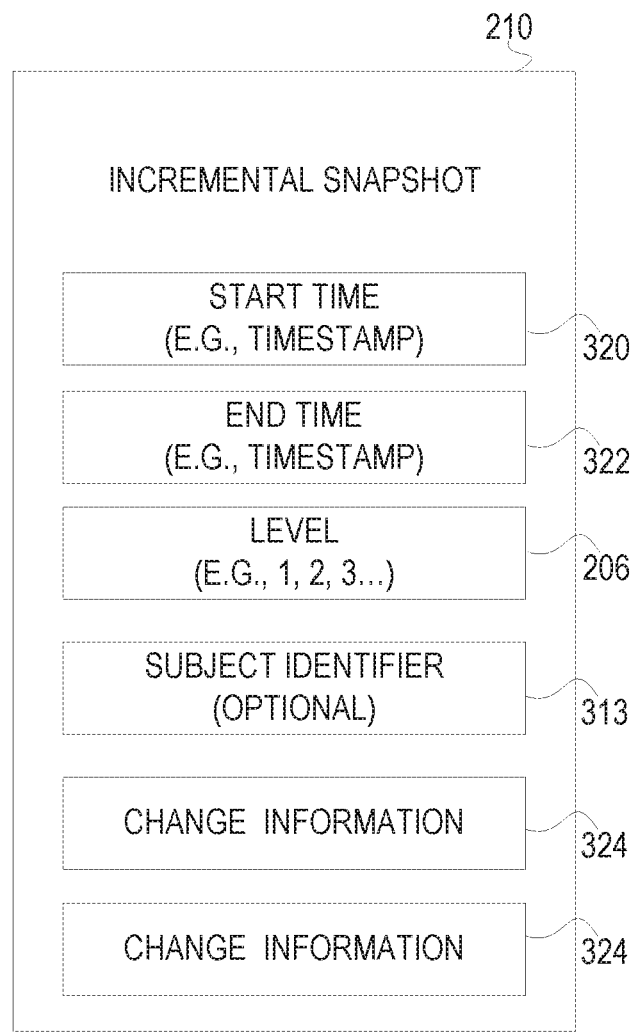
FIG. 3D is a block diagram illustrating an incremental snapshot, according to an embodiment.

FIG. 3D is a block diagram illustrating an incremental snapshot 210, according to an embodiment. The incremental snapshot 210 may include a start time 320, an end time 322, a level 206, a subject identifier 313, and one or more entries of change information 324. The start time 320 and end time 322 define the endpoints of a time segment (e.g., period) in which any change to the image 314, at the production machine 102, causes a generation of change information 324, at the production machine 102 that, in turn, includes an agent that may communicate the change information 324 to the backup machine 104 that, in turn, stores the change information 324 in the incremental snapshot 210. The level 206 and subject identifier 313 were previously described. The subject identifier 313 may identify the virtual machine that is the subject of the image 314 in the incremental snapshot 210.

Figure 3E:
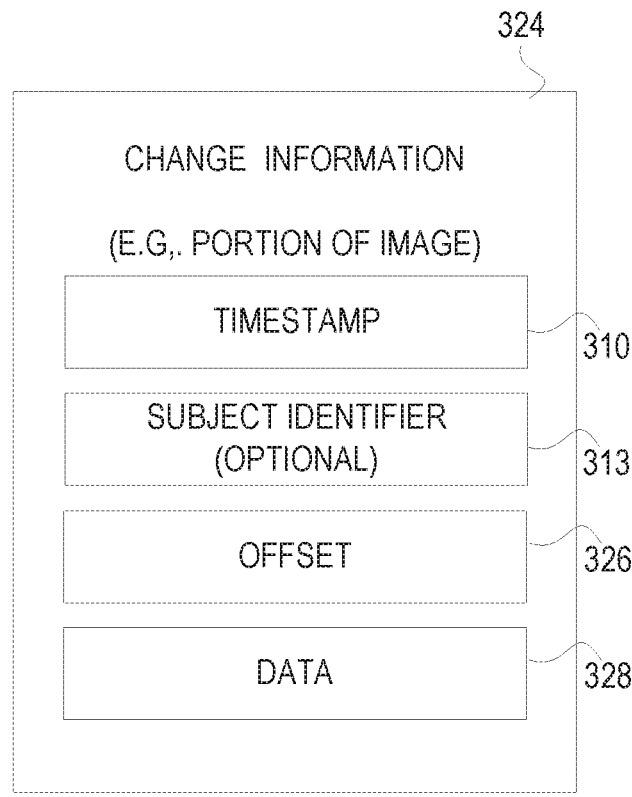
FIG. 3E is a block diagram illustrating change information, according to an embodiment.

FIG. 3E is a block diagram illustrating change information 324, according to an embodiment. The change information 324 may include a timestamp 310, a subject identifier 313, an offset 326, and data 328. The timestamp 310 and subject identifier 313 were previously described. The offset 326 identifies a first storage location of the data in a logical address space. A base address corresponding to the subject identifier 313 may be added to the offset 326 to access the first storage location of the data on the production machine 102. In addition, a base address of "0" may be added to the offset 326 to access the first storage location of the data in the snapshot information 122 or the cached snapshot information 124. The data 328 was written to the logical address space on the production machine 102 for the subject identified with the subject identifier 313 at the offset 326 and a time registered by the timestamp 310.

Figure 3F:
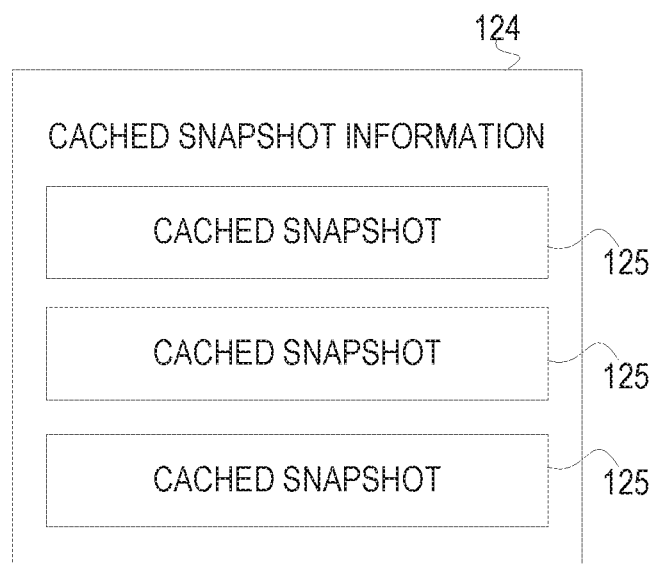
FIG. 3F is a block diagram illustrating cached snapshot information, according to an embodiment.

FIG. 3F is a block diagram illustrating cached snapshot information 124, according to an embodiment. The cached snapshot information 124 may be stored in solid state disk memory 116. The cached snapshot information 124 may be written and read by the cache module 114. The cached snapshot information 124 includes one or more entries of cached snapshots 125 that respectively correspond to snapshots 306 (e.g., full snapshot 208 or incremental snapshot 210) in the snapshot information 122. The cached snapshot information 124 may be accessed based on a level 206.

Figure 3G:
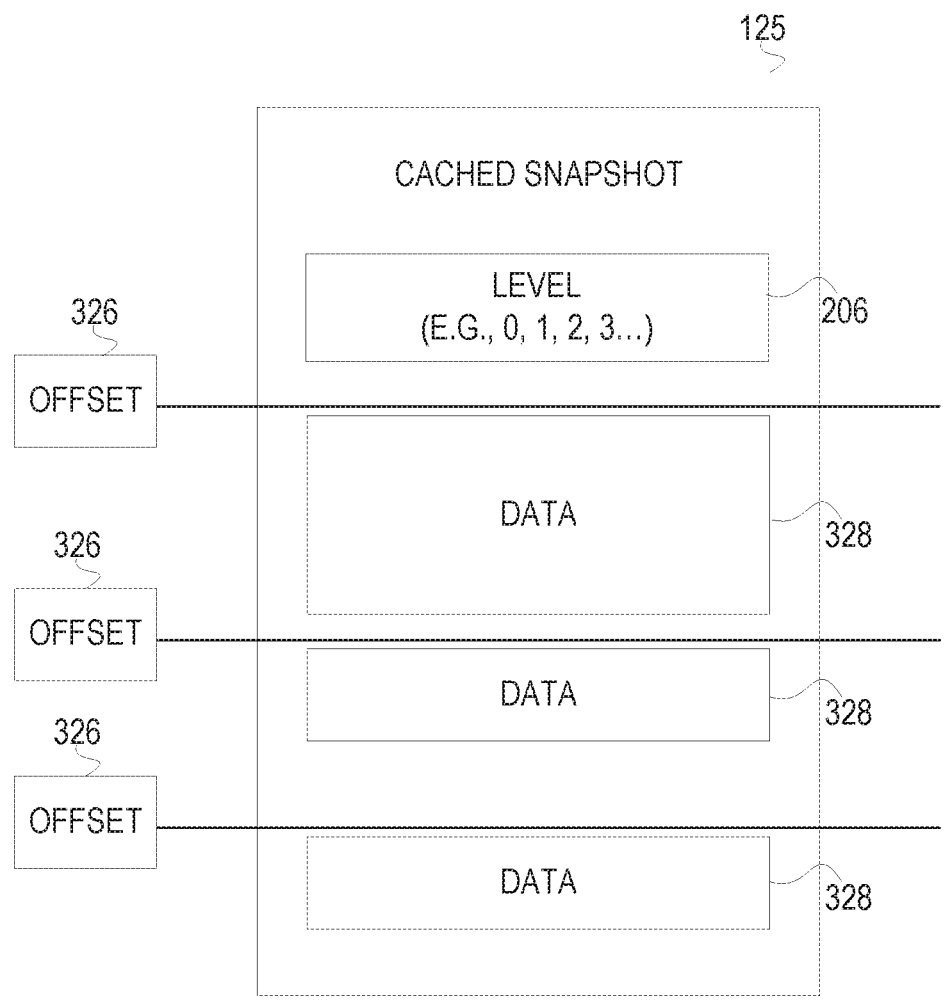
FIG. 3G is a block diagram illustrating a cached snapshot, according to an embodiment.

FIG. 3G is a block diagram illustrating a cached snapshot 125, according to an embodiment. The cached snapshot 125 includes a level 206 and one or more entries of data 328. The cached snapshot 125 stores data 328 that is read from the snapshot information 122. The cached snapshot 125 receives data 328 that is written by the cache module 114 responsive to the cache module 114 identifying the data 328 is read from the snapshot information 122. The cached snapshot 125 receives the data 328 that is written by the cache module 114 responsive to the cache module 114 processing a read request 202. The cached snapshot 125 may be stored in the solid state disk memory 116 according to the offset 326 and the data 328, as previously described.

Figure 3H:
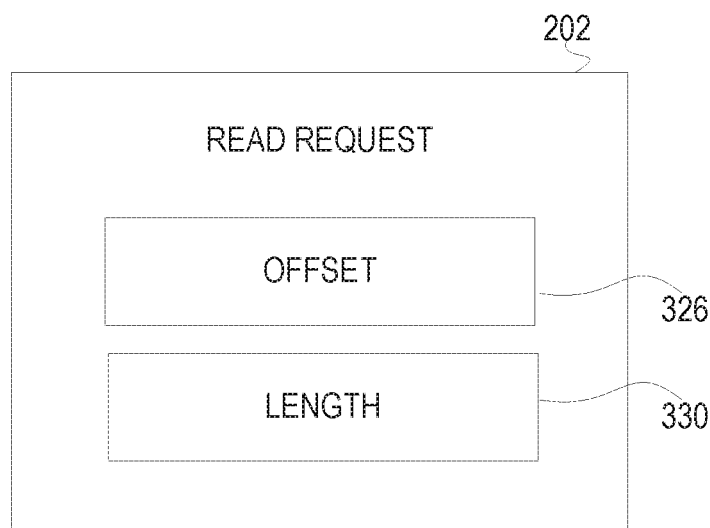
FIG. 3H is a block diagram illustrating a read request, according to an embodiment.

FIG. 3H is a block diagram illustrating a read request 202, according to an embodiment. The read request 202 may be communicated by the job module 112 to the cache module 114. The read request 202 may include an offset 326 and a length 330. The read request may be utilized to retrieve data from optimized snapshot information 204 based on the offset 326 and the length 330.

Figure 4A:
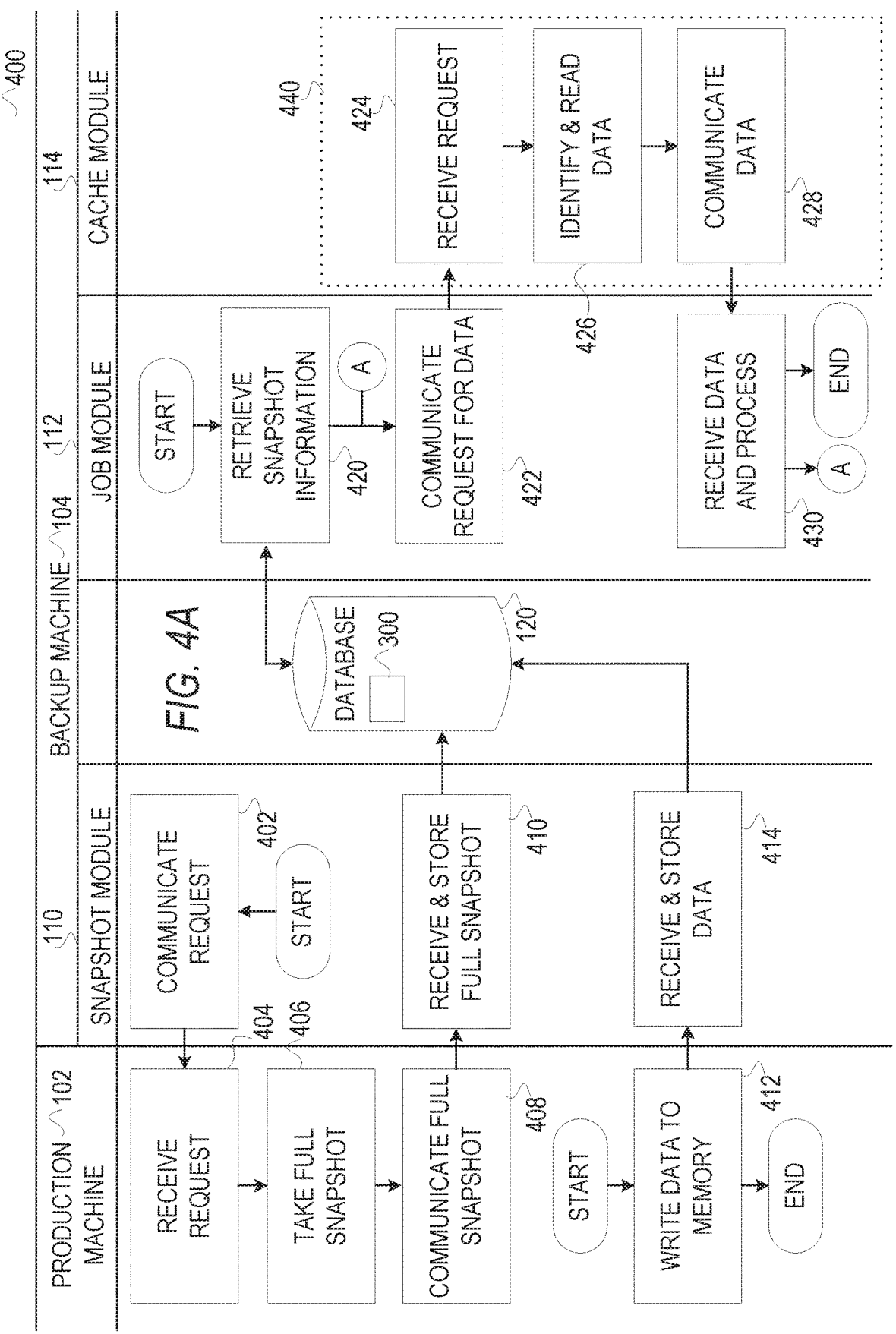
FIG. 4A is a block diagram illustrating a method, according to an embodiment, to optimize snapshot image processing.

FIG. 4A is a block diagram illustrating a method 400, according to an embodiment, to optimize snapshot image processing. The production machine 102 is illustrated on the left and the backup machine 104 on the right. At the backup machine 104, the snapshot module 110 is illustrated on the far left; the database 120 is illustrated in the middle left; the job module 112 is illustrated in the middle right; and the cache module 114 is illustrated on the far right. The method 400 commences at operation 402, with the snapshot module 110 communicating a request for a full snapshot 208 to the production machine 102. For example, the snapshot module 110 may communicate a request including a subject identifier 313 identifying the subject (e.g., virtual machine) of the snapshot 306.

Full Snapshot

At operation 404, the production machine 102 receives the request for the full snapshot. At operation 406, the production machine 102 takes a full snapshot by generating an image 314 of the subject and storing the image 314 of the subject in the full snapshot 208. For example, the production machine 102 may identify a base address based on the subject identifier and store the image 314 of the virtual machine into the full snapshot 208. Further, production machine 102 may store a timestamp 310 (e.g., current date and time), level 206 ("0" for full), and subject identifier 313 into the full snapshot 208. At operation 408, the production machine 102 communicates the full snapshot 208 to the snapshot module 110.

At operation 410, the snapshot module 110 receives the full snapshot 208 and stores the full snapshot 208 in the snapshot catalogue 300 in the database 120. For example, the snapshot module 110 may store the full snapshot 208 in a virtual machine catalogue 121 in the snapshot catalogue 300 based on the subject identifier 313. Further for example, the snapshot module 110 may store the full snapshot 208 in snapshot information 122 based on the timestamp 310.

Incremental Snapshot

At operation 412, the production machine 102 communicates a request to the snapshot module 110. The request may include a request to write data to the database 120. For example, the request to write data may include the change information 324. The change information 324 may be initialized with a timestamp 310, a subject identifier 313 identifying a virtual machine, an offset 326, and the data 328 (e.g., data being written).

At operation 414, the snapshot module 110 receives the change information 324 and stores the change information 324 in the appropriate incremental snapshot 210 in the database 120. For example, the snapshot module 110 stores the change information 324 in the appropriate incremental snapshot 210 based on the subject identifier 313 and the timestamp 310.

Job Execution

At operation 420, the job module 112 is invoked to execute a job that, in turn, retrieves snapshot information 122 from the database 120. For example, the job module 112 may be invoked by a scheduler that routinely executes an indexing job that executes under the job module 112. It will be appreciated by one skilled in the art that the operations 422-430 may be iterated. For example, the job may iterate the operations 422-430 for each virtual machine hosted by the production machine 102. At operation 422, the job module 112 executes to communicate a read request 202 to the cache module 114. For example, read request 202 may include an offset 326 and a length 330 identifying the location and length of data 328.

At operation 424, the cache module 114 receives the read request 202. At operation 426 the cache module 114 identifies and reads the requested data 328 from the optimized snapshot information 204 (e.g., snapshot information 122 or cached snapshot information 124). At operation 428, the cache module 114 communicates a response including the data 328 that was requested to the job module 112. The operations 424-428 are described in more detail as illustrated on FIG. 4B. The job module 112 communicates with the cache module 114 over interface 440 that, in turn, may be utilized by modules (e.g., test module) other than the cache module 114.

At operation 430, the job module 112 receives the response, retrieves the data 328 that was requested, and processes the data 328. For example, the job module 112 may include an indexing job that executes under the job module 112 to request, receive, and process the data 328, as previously described. The operation 430 branches to operation 422 or ends.

Figure 4B:
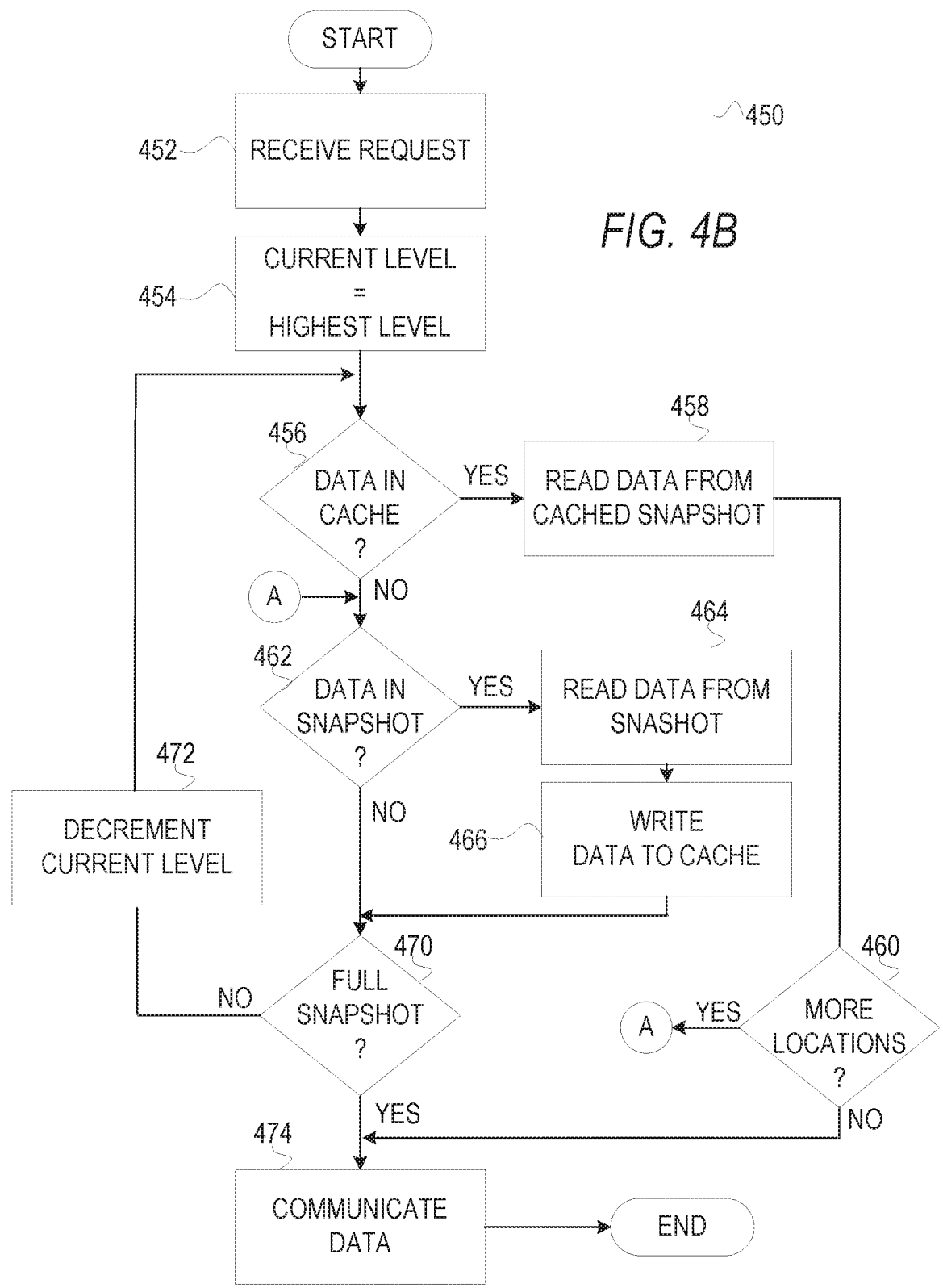
FIG. 4B is a block diagram illustrating a method, according to an embodiment, to optimize snapshot image processing.

FIG. 4B is a block diagram illustrating a method 450, according to an embodiment, to optimize snapshot image processing. The method 450 amplifies the description and illustration of operations 424-428 on FIG. 4A. The method 450 is described in association with the example 250 in FIG. 2C, including a read request 202, and example 260 in FIG. 2D including a response 244 to the read request 202. The example 250 illustrates snapshot information 122 and cached snapshot information 124 at the time of receiving the read request 202 from the job module 112 and the example 260, in FIG. 2D, illustrates the snapshot information 122 and cached snapshot information 124 at the time of communicating the response 244 to the job module 112. The method 450 commences at operation 452 with the cache module 114, at the backup machine 104, receiving the read request 202 from the job module 112. For example, the read request 202 may include an offset 326 of "2" and a length 17," as illustrated in FIG. 2C (e.g., range of storage locations being "2-18"). Returning to FIG. 4B, at operation 454, the cache module 114 initializes a register including a current level to the level 206 that is highest (e.g., most recent snapshot). For example, the cache module 114 may initialize the current level to level "3" based on the most recent snapshot 306 (e.g., "I-3") in snapshot information 122, as illustrated in FIG. 2C.

At decision operation 456, the cache module 114 identifies whether any storage location in the requested storage locations, at the current level (e.g., "3"), is registered with data 328 in the cached snapshot information 124. If the cache module 114 identifies data 328 is registered in any of the requested locations in the cached snapshot information 124, then a branch is made to operation 458. Otherwise, a branch is made to decision operation 462. In the present example, the cached snapshot information 124, at level "3," includes the data "KIWI" at locations "12-15," causing a branch to operation 458.

At operation 458, the cache module 114 reads the data 328 from the cached snapshot information 124 at the current level (e.g., "3") and stores the data 328 in the response 244. In the present example, the cache module 114 reads data from the cached snapshot information 124 for level "3" (e.g., incremental snapshot) "1-3"), as illustrated in FIG. 2C, at the storage locations "12-15" (e.g., "KIWI") (e.g., third portion of data). In a second example, the cache module 114 reads data from the cached snapshot information 124 for level "0" (e.g., full snapshot) (e.g., "F-0"), as illustrated in FIG. 2C, at the storage locations "2-4" (e.g., "PIE") (e.g., fourth portion of data) and storage location "6" (e.g., "NA") (e.g., fifth portion of data).

At decision operation 460, the cache module 114 identifies whether the read request 202 includes more locations to be read from the optimized snapshot information 204. If more locations are requested (e.g., storage locations "2"-"11" and "16"-"18") then a branch is made to decision operation 462 via on-page connector "A." Otherwise a branch is made to operation 474. In the present example, the cache module 114 identifies more locations are to be read from optimized snapshot information 204 (e.g., storage locations "2"-"11" and "16"-"18").

At decision operation 462, the cache module 114 identifies whether the snapshot information 122, at the current level (e.g., "3"), stores data 328 for any of the remaining storage locations (e.g., locations "2"-"11" and "16"-"18"). If the cache module 114 identifies the snapshot information 122, at the current level (e.g., "3"), stores data 328 for any of the remaining storage locations, then a branch is made to operation 464. Otherwise a branch is made to decision operation 470. In the present example, the snapshot information 122 for level "3," as illustrated in FIG. 2C, stores data 328 for the remaining storage location "16" (e.g., "S") (e.g., first portion of data).

At operation 464, the cache module 114 reads data from the snapshot information 122. In the present example, the cache module 114 reads data from the snapshot information 122 for level "3" (e.g., incremental snapshot) (e.g., "I-3"), as illustrated in FIG. 2C, at the storage location "16" (e.g., "S") (e.g., first portion of data). In a second example, the cache module 114 reads data from snapshot information 122 for level "0" (e.g., full snapshot) (e.g., "F-0"), as illustrated in FIG. 2C, at the storage locations "17" and "18" (e.g., "NA") (e.g., first portion of data).

At operation 466, the cache module 114 writes the data read from the snapshot information 122 (at operation 464) to the cached snapshot information 124 at the current level. In the present example, the snapshot information 122 for level "3," as illustrated in FIG. 2C, writes the data read from the snapshot information 122 (at operation 464) to the cached snapshot information 124 at the current level (e.g., level "3"). In the present example, the cache module 114 writes the data (e.g., "S") (e.g., first portion of data) that was read from the snapshot information 122 for level "3" (e.g., incremental snapshot) (e.g., "I-3") "16", as illustrated in FIG. 2C, to the cached snapshot information 124. In a second example, the cache module 114 writes the data (e.g., "NA") (e.g., first portion of data) that was read from the snapshot information 122 for level "0" (e.g., full snapshot) (e.g., "F-0") "16", as illustrated in FIG. 2C, to the cached snapshot information 124.

At decision operation 470, the cache module 114 identifies whether the current level is the level 206 of the full snapshot 208 (e.g., level "0"). If the current level is the level 206 of the full snapshot 208 (e.g., level "0"), then a branch is made to operation 474. Otherwise a branch is made to operation 472. At operation 472, the cache module 114 decrements the current level by one. At operation 474 the cache module 114 communicates the data retrieved from the optimized snapshot information 204 to the job module 112. The above operations are iterated until the full snapshot is reached.

Figure 5:
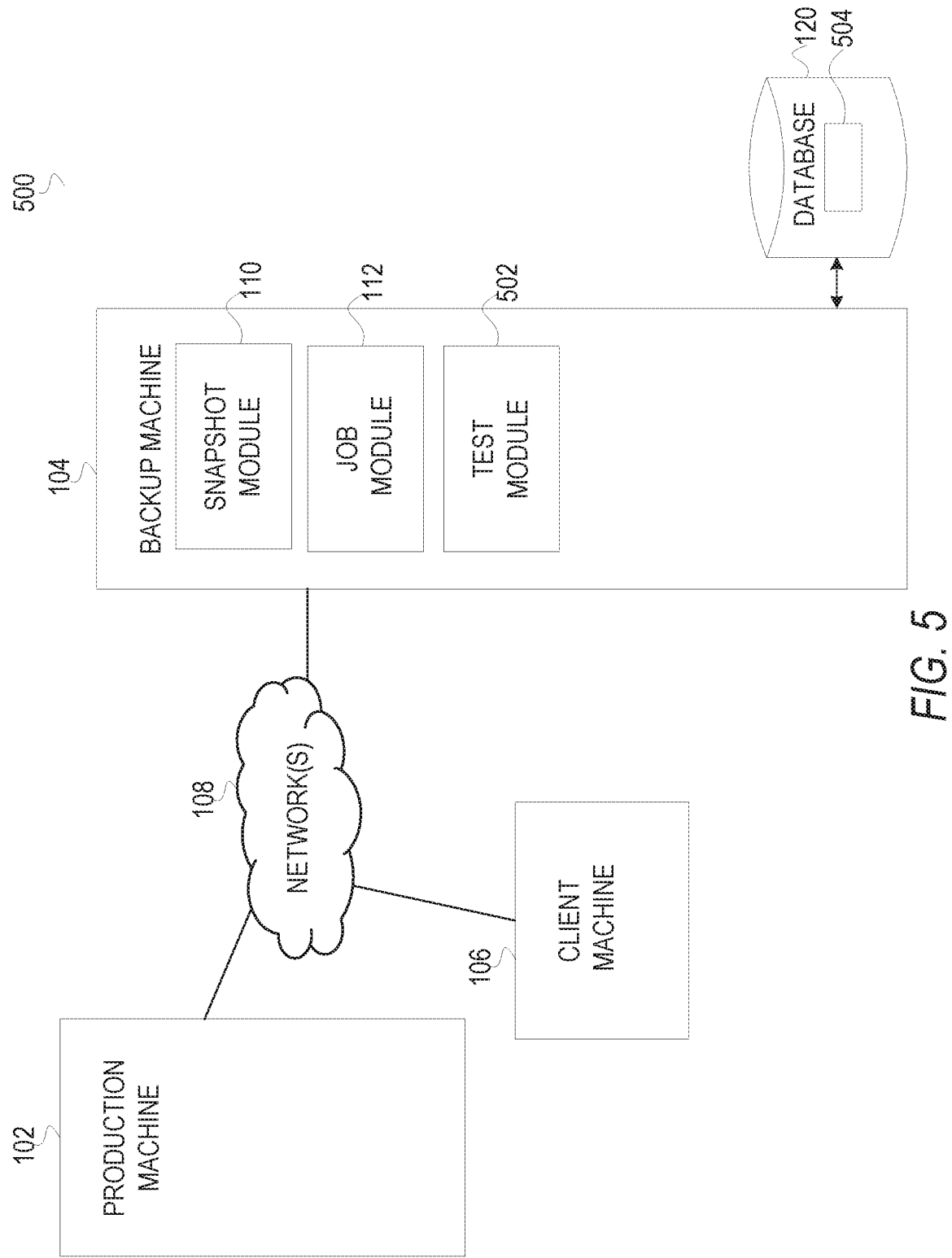
FIG. 5 is a block diagram illustrating a system, according to an embodiment, to classify snapshot image processing.

FIG. 5 is a block diagram illustrating a system 500, according to an embodiment, to classify snapshot image processing. The system 500 provides a technical solution to a technical problem. The technical problem is how to identify whether a job is optimized to read data from snapshot information by utilizing a cache where the snapshot information includes a set of snapshots of one or more subjects hosted by a production machine; and where the set of snapshots includes a full snapshot and at least one incremental snapshot; and where the full snapshot is an image of a subject (e.g., virtual machine) on the production machine (e.g., logical address space); and where the image of the subject on the production machine comprises a range of storage locations (e.g., logical address space).

The technical solution to the technical problem is to classify whether a job is optimized by utilizing a cache by monitoring duplicate reads according to the snapshot information. Specifically, the technical solution is to identify duplicate reads from the snapshots based on multiple iterations of the job executed on the same snapshot information or its pedigree, and aggregate the duplicate reads (e.g., aggregated duplicate reads) across iterations of the job to identify whether utilization of a cache optimizes the job by comparing a count of the aggregated duplicate reads with a predetermined threshold. That is, the count of the aggregated duplicate reads is a proxy for a workload characterized by: 1) semi-repeatable random input/output I/O; and where 2) the changes, but at a fairly slow rate are optimized by utilizing a cache.

System 500 includes a production machine 102, a backup machine 104, and a client machine 106 that communicate over a network 108 (e.g., Internet). The backup machine 104 may include a snapshot module 110, a job module 112, and a test module 502. The backup machine 104 is communicatively coupled to a database 120 including hard disk drive storage 118. The system 500 corresponds to the system 100 in FIG. 1; accordingly, the same or similar references have been used to indicate the same or similar features unless otherwise indicated. According to one embodiment, the system 500 may be implemented as a single software platform that delivers backup, instant recovery, archival, search, analytics, compliance, and copy data management in one secure fabric across data centers and clouds as offered by Rubrik, of Palo Alto, Calif.

Generating and Storing Read Events

The test module 502 receives a request to read data (e.g., read request 202) from the job module 112; generates and stores one or more read events based on the read request 202, where each read event identifies a snapshot utilized to read of all or a portion of the data being requested; reads the data 328 from the one or more snapshots; and communicates the data 328 back to the job module 112. The test module 502 is repeatedly invoked by the job module 112 to read data until the job completes. In addition, the test module 502 may be invoked by the job module 112 based on subsequent and multiple iterations of the job.

Identifying & Aggregating Duplicate Read Events

The test module 502 may be invoked, apart from generating and storing read events, to identify duplicate read events. The test module 502 may identify duplicate read events according to snapshots and aggregates duplicate read events according to snapshots to generate counts of aggregated duplicate reads and identify whether utilizing a cache optimizes the job based on the counts of the aggregated duplicated reads. For example, the test module 502 may compare a percentage that is derived from the counts with a predetermined threshold to determine whether a cache may be utilized to optimize the job. Real-world examples are provided in this document.

Figure 6A:
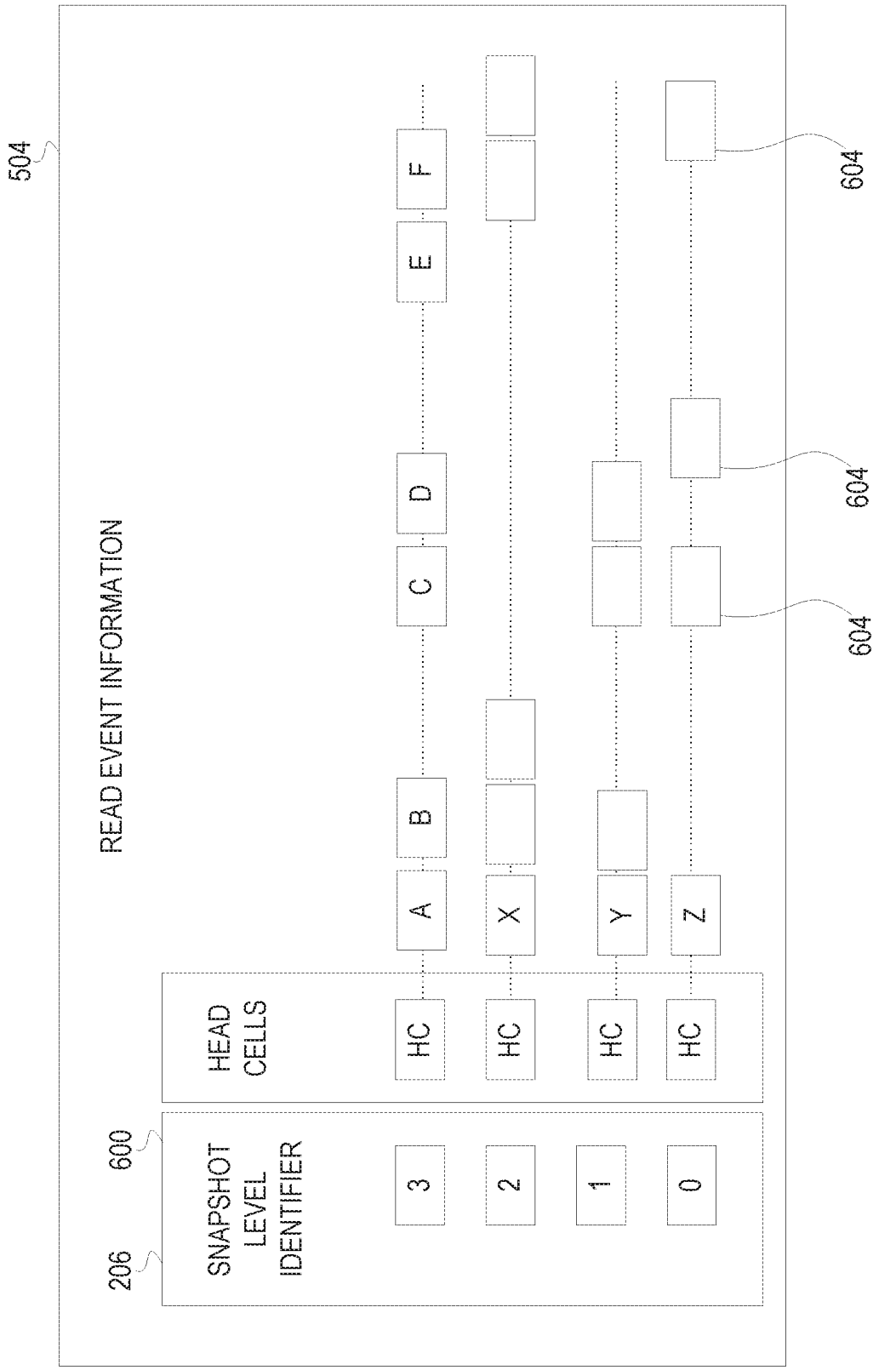
FIG. 6A is a block diagram illustrating read event information, according to an embodiment.

FIG. 6A is a block diagram illustrating read event information 504, according to an embodiment. The read event information 504 may be utilized by the test module 502 to store and aggregate read events 604 (e.g., first plurality of read events). The read event information 504 stores one or more read events 604 responsive to the test module 502 being invoked by the job module 112 with a read request 202. Each read request 202 requests the test module 502 to read data 328 from snapshot information 122. Each read event 604 (e.g., second plurality of read events) signifies the test module 502 reading all or a portion of the requested data from a snapshot 306 at a level 206 in the snapshot information 122. Each read event 604 is threaded on a linked list that starts with a head cell that corresponds to a snapshot 306 at a level 206 in snapshot information 122. The read event information 504 stores read events 604 of one or more executions of the job module 112 (e.g., multiple iterations of an indexing job).

Generating and Storing Read Events

The head cells may be utilized to create linked lists of read events 604 that are generated and stored in accordance with reading data 438 from snapshots 306. For example, the snapshot level identifiers 600 "3," "2," "1," and "0" respectively correspond to snapshots 306 at different levels 206 in the snapshot information 122, as illustrated in FIG. 2C (e.g., "I-3," "I-2," I-1," B-0"), and to linked lists in the read event information 504. Read events 604 are added to a linked list by the test module 502 responsive to the test module 502 reading data 328 from a snapshot 201 corresponding to the linked list. For example, consider a read request 202 including an offset 326 of "10" and a length 330 of "8" causing the test module 502 to read data 328 from locations "10" and "11" of snapshot "I-3" and to read data 328 from locations "12" and "13" of snapshot "I-2" and to read data 328 from locations "14" and "15" of snapshot "I-1" and to read data 328 from locations "16" and "17" of snapshot "B-0." Responsive to the aforementioned reads, the test module 502 generates four read events 604 and threads them onto the corresponding queues. For example, the test module 502 generates a first read event 604 (e.g., "A") including an offset "10" and length "2" that is threaded onto the linked list corresponding to snapshot level identifier "3" (e.g., "I-3"); generates a second read event 604 (e.g., "X") including an offset "12" and length "2" that is threaded onto the linked list corresponding to snapshot level identifier "2" (e.g., "I-2"); generates a third read event 604 (e.g., "Y") including an offset "14" and length "2" that is threaded onto the linked list corresponding to snapshot level identifier "1" (e.g., "N"); and generates a fourth read event 604 (e.g., "Z") including an offset "16" and length "2" that is threaded onto the linked list corresponding to snapshot level identifier "0" (e.g., "B-0").

Identifying Duplicate Read Events

The read events 604 in a linked list may be compared with each other to identify duplicates (e.g., duplicated read events 604). For example, the read events 604 in the linked list associated with the snapshot level identifier "3" may be compared with each other to identify duplicates. In this example, the read event 604 "A" is selected and compared with read event 604 "B." Responsive to identifying read event 604 "A" and read event 604 "B as duplicates (e.g., "exact match" or "inclusive match" or "overlapping match," as described below), the read events 604 "A" and "B" are registered as duplicates. Next, the read event 604 "A" is compared with read event 604 "C," and responsive to identifying duplicates, the read event 604 "C" is registered as duplicate, and so forth until the read events 604 in the linked list "3" are exhausted. Next, a search is made for a read event 604 in the linked list not previously identified a duplicate. If found, then the above steps are iterated. For example, assuming the read event 604 "A" matched read events 604 "B," "C," and D" but not "E" and "F" then read events 604 "A," "B," "C," and D" are marked (e.g., registered) duplicate and read event 604 "E" is compared with the read event 604 "F," and so forth until the read events 604 are exhausted. If a search is made for a read event 604 not marked duplicate is not found, then the above described steps are iterated for the next linked list until the linked lists are exhausted.

Aggregating Duplicate Read Events

The read events 604 identified as duplicates (e.g., duplicate read events) may be aggregated to identify counts of aggregated duplicated reads. For example, if the read event 604 "A" in the linked list identified with snapshot level identifier "3" matched to the remaining read events 604 (e.g., "B," "C," "D," "E," and "F") in the linked list, then the number of duplicate read events for the linked list is "6." Also, for example, the total number of read events 604 in the read event information 504 may be identified as duplicates (e.g., read events 604) by aggregating counts of duplicated read events for each linked list.

Percentages of duplicate read events 604 may be computed by dividing duplicate read events 604 by total read events. For example, percentages of duplicate read events 604 for a linked list may be computed by dividing duplicate read events 604 counted in a linked list by total read events counted in the linked list. Further for example, percentages of duplicate read events 604 for the read event information 504 may be computed by dividing duplicate read events 604 counted in the read event information 504 by total read events counted in the read event information 504.

Figure 6B:
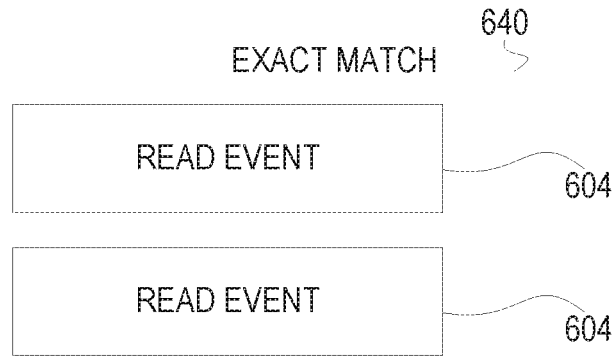
FIG. 6B is a block diagram illustrating definition, according to an embodiment.
Figure 6C:
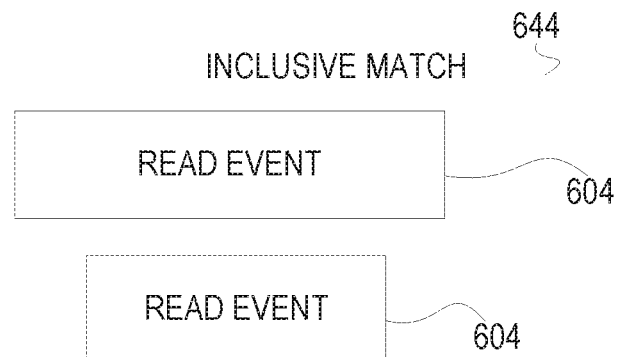
FIG. 6C is a block diagram illustrating definition, according to an embodiment.
Figure 6D:
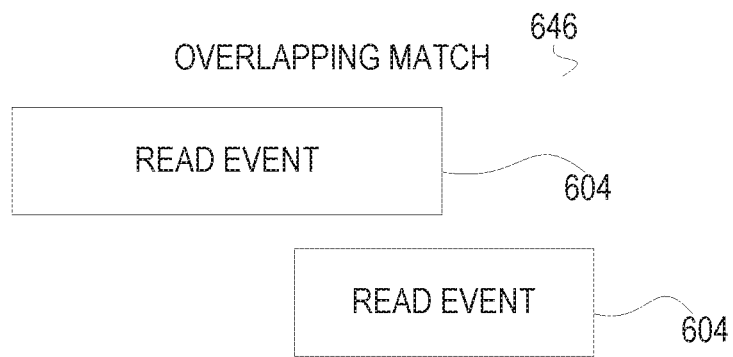
FIG. 6D is a block diagram illustrating definition, according to an embodiment.

FIGS. 6B, 6C, and 6D are block diagrams respectively illustrating definitions 640, 644, and 646, according to an embodiment. The definition 640, 644, or 646 may be utilized by the test module 502 to identify whether a comparison of two read events 604 yields a duplicate (e.g., match). The definition (e.g., definition 640, 644, or 646) utilized by the test module 502 may be configured with a configurable parameter. For example, the test module 502 may receive a selection identifying whether the definition 640 (e.g., "exact match") is utilized to compare read events 604.

FIG. 6B is a block diagram illustrating definition 640, according to an embodiment. The definition 640 may be utilized by the test module 502 to identify whether a comparison of two read events 604 yields a duplicate. The definition 640 defines an "exact match." For example, a first read event 604 and a second read event 604 are identified as duplicates based on the definition 640 responsive to the test module 502 identifying the offset 326 (e.g., "30") and length 330 (e.g., "10") of a first read event 604 as exactly matching the offset 326 (e.g., "30") and length 330 (e.g., "10") of a second read event 604.

FIG. 6C is a block diagram illustrating definition 644, according to an embodiment. The definition 644 may be utilized by the test module 502 to identify whether a comparison of two read events 604 yields a duplicate. The definition 644 is an "inclusive match." For example, a first read event 604 and a second read event 604 are identified as duplicates based on the definition 644 responsive to the test module 502 identifying an offset 326 (e.g., "30") and length 330 (e.g., "10") of a first read event 604 as including an offset 326 (e.g., "35") and a length 330 (e.g., "5") of a second read event 604. Further for example, a first read event 604 and a second read event 604 are identified as duplicates based on the definition 644 responsive to the test module 502 identifying an offset 326 (e.g., "30") and a length 330 (e.g., "10") of a first read event 604 including an offset 326 (e.g., "30") and a length 330 (e.g., "5") of a second read event 604. Further for example, a first read event 604 and a second read event 604 are identified as duplicates based on the definition 644 responsive to the test module 502 identifying that an offset 326 (e.g., "35") and a length 330 (e.g., "3") of the first read event 604 are included in an offset 326 (e.g., "30") and a length 330 (e.g., "10") of a second read event 604.

FIG. 6D is a block diagram illustrating definition 646, according to an embodiment. The definition 646 may be utilized by the test module 502 to identify whether a comparison of two read events 604 yields a duplicate. The definition 644 is an "overlapping match." For example, a first read event 604 and a second read event 604 are identified as duplicates based on the definition 646 responsive to the test module 502 identifying an offset 326 (e.g., "30") and a length 330 (e.g., "10") of a first read event 604 as overlapping an offset 326 (e.g., "35") and a length 330 (e.g., "3") of a second read event 604. Further for example, a first read event 604 and a second read event 604 are identified as duplicates based on the definition 646 responsive to the test module 502 identifying an offset 326 (e.g., "35") and a length 330 (e.g., "3") of a first read event 604 overlapping an offset 326 (e.g., "30") and a length 330 (e.g., "10") of a second read event 604.

Figure 7:
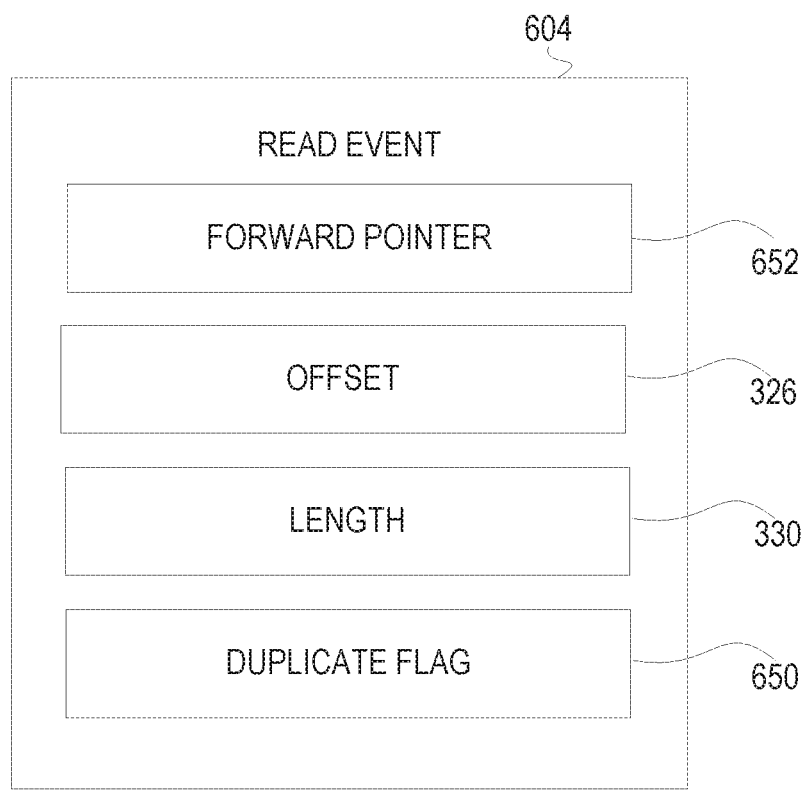
FIG. 7 is a block diagram illustrating a read event, according to an embodiment.

FIG. 7 is a block diagram illustrating a read event 604, according to an embodiment. The read event 604 includes a forward pointer 652, the offset 326, the length 330, and a duplicate flag 650. A head cell points to the first read event 604 in a linked list and the forward pointer 652 points to the next read event 604 in the linked list. The forward pointer 652 is utilized by the test module 502 to thread the read event 604 onto a linked list. The offset 326 and length 330 were previously described. The duplicate flag 650 is asserted (e.g., "1") to identify the read event 604 as a duplicate.

Figure 8A:
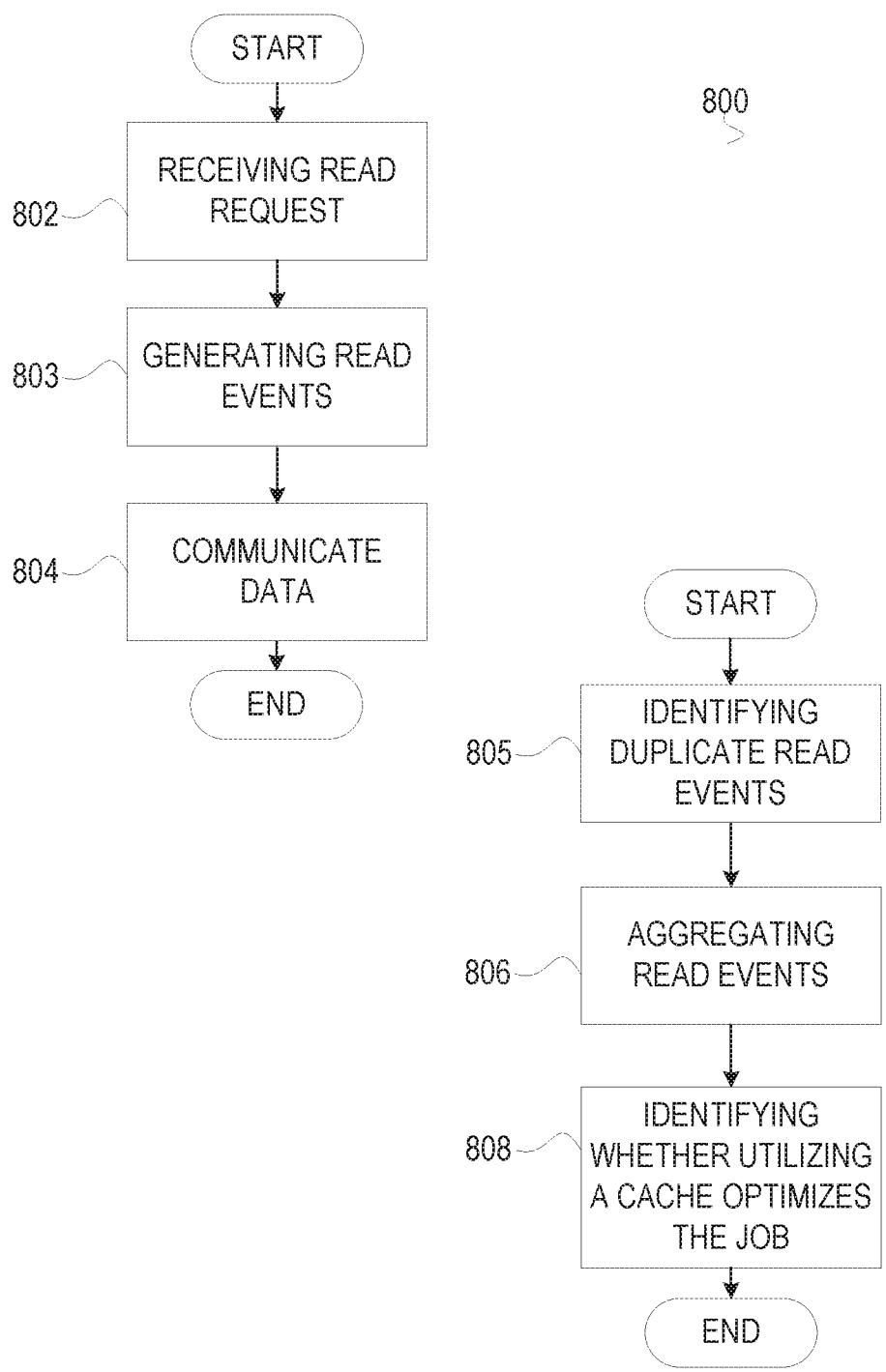
FIG. 8A is a block diagram illustrating a method, according to an embodiment, to classify snapshot image processing.

FIG. 8A is a block diagram illustrating a method 800, according to an embodiment, to classify snapshot image processing. The method 800 is performed by the test module 502. The method 800 is utilized by the test module 502 to process read requests 202. The method 800 is utilized by the test module 502 to classify whether utilizing a cache optimizes a job that is communicating the read requests 202 to the test module 502. The method 800 includes operations 802-804 and operations 805-808. The operations 802 and 804 may be performed by the test module 502 communicating over the interface 440 with the job module 112, as illustrated in FIG. 4A. For example, the job may be an indexing job that is utilized to process snapshot information 122 for virtual machines to generate virtual machine search indexes. According to an embodiment, each iteration of the indexing job may be identified with a job iteration identifier and defined as executing the indexing job to completion. Returning to FIG. 8A, the method 800 commences, at operation 802, with the test module 502 receiving a read request 202 from the job module 112. For example, the read request 202 may include an offset 326 of "2" and a length 17" identifying a range of storage locations to read from the snapshot information 122. At operation 803, the test module 502 reads data 328 from the appropriate snapshots 306 based on the read request 202, generates one or more read events 604 based on the read request 202, and threads the read events 604 onto linked lists corresponding to the snapshots 306 from which the data 328 was read. For example, the test module 502 may generate one or more read events 604 and thread the read events 604 on to linked lists as described in FIG. 6A and FIG. 8B. Returning to FIG. 8A, at operation

804, the test module 502 communicates the data that was requested to the job module 112.

Identifying Whether Utilizing a Cache Optimizes a Job

The test module 502 may be invoked to identify whether utilizing a cache optimizes the job. Identifying whether utilizing a cache optimizes the job includes, at least, identifying read events 604 that are duplicates, aggregating read events, and identifying whether utilizing a cache optimizes the job based on the aggregated read events.

At operation 805, the test module 502 identifies read events 604 that are duplicates. For example, the test module 502 may compare each of the read events 604 on the linked lists (e.g., a particular level of snapshot information 122) to count as duplicate. This operation is described in more detail in FIG. 8C.

Counting Duplicate Read Events

At operation 806, the test module 502 aggregates duplicate read events 604. According to an embodiment, at operation 806, the test module 502 may aggregate duplicate read events for snapshots 306 to generate counts of aggregated duplicate read events for snapshots 306. For example, the number of read events 604 identified as duplicates for level "2" (e.g., "I-2") (e.g., incremental snapshot 210) may be "10" (out of a total of "15" read events 604); the number of read events 604 identified as duplicates for level "1" (e.g., "I-1") (e.g., incremental snapshot 210) may be "20" (out of a total of "25" read events 604); and the number of read events 604 identified as duplicates for level "0" (e.g., "F-0") (e.g., full snapshot 208) may be "30" (out of a total of "35" read events 604). Accordingly, the counts of aggregated duplicate read events for the snapshots 306 include a count of "10" corresponding to incremental snapshot 210 at level "2" (e.g., "I-2"), and a count of "20" corresponding to incremental snapshot 210 at level "1" (e.g., "I-1"), and a count of "30" corresponding to full snapshot 208 at level "0" (e.g., "F-0"). According to an embodiment, the test module 502 may aggregate counts of aggregated duplicate read events for snapshots 306 to generate a count of total duplicated read events. For example, the count of total duplicated read events may be "60" (e.g., "10"+"20"+"30").

Counting Read Events

According to an embodiment, at operation 806, the test module 502 may aggregate total read events for snapshots to generate counts of aggregated total read events for snapshots. For example, the counts of aggregated total read events for the snapshots 306 include a count of "15" corresponding to incremental snapshot 210 at level "2" (e.g., "I-2"), and a count of "25" corresponding to incremental snapshot 210 at level "1" (e.g., "I-1"), and a count of "35" corresponding to full snapshot 208 at level "0" (e.g., "F-0").

According to an embodiment, at operation 806, the test module 502 may aggregate counts of aggregated total read events for snapshots 306 to generate a count of total read events. For example, the count of total read events may be "80" (e.g., "15"+"25"+"35").

Other Embodiment to Count Duplicates

According to another embodiment, the test module 502 may count duplicates in a different way. In this embodiment, the test module 502 aggregates duplicate bytes read and total bytes read. For example, the test module 502 may utilize the method 450 to aggregate duplicate bytes read and total bytes read. In this example, the test module 502 may increment a count of duplicate bytes corresponding to the offset and length being processed in operation 458 (e.g., duplicate) and increment a count of total bytes read corresponding to an offset and a length being processed in operation 458 (e.g., duplicate) or in operation 464 (e.g., not a duplicate byte).

Causing Invocation of the Cache Module Responsive to the Test Module Identifying Utilization of a Cache Optimizes the Job At operation 808, the test module 502 identifies whether the job may be optimized by utilizing a cache. The test module 502 identifies whether the job is optimized by utilizing a cache by computing a percentage of duplicate reads and comparing the percentage to a predetermined threshold. The percentage of duplicate read events may be computed based on a numerator including the total duplicated read events and a denominator including the total read events. For example, the test module 502 may compute a percentage of duplicate reads (e.g., 60/75=80%) by dividing the duplicate read events (e.g., "60") with a count of the total read events (e.g., "75"). Further, the test module 502 may compare the percentage of duplicate reads with a predetermined threshold (e.g., 70%) to identify whether the job is optimized by utilizing a cache. For example, if the percentage of duplicate reads is greater or equal to the predetermined threshold, then the job is identified as being optimized by utilizing a cache. According to an embodiment, the predetermined threshold is a configurable parameter. According to an embodiment, the test module 502 may cause all subsequent scheduling or invocations of the job module 112 to utilize the cache module 114 rather than the test module 502 responsive to the test module 502 identifying that the job is optimized by utilizing a cache.

Other Embodiment to Compute Percentages

According to one embodiment, the test module 502 identifies whether the job is optimized by utilizing a cache by computing a percentage of duplicate reads and comparing the percentage to a predetermined threshold. The percentage of duplicate reads may be computed based on a numerator including duplicate bytes read, as described above, and a denominator including total bytes read, as described above. For example, the test module 502 may compute a percentage of duplicate reads (e.g., 600/750=80%) by dividing the count of duplicate bytes read (e.g., "600") with a count of the total bytes read (e.g., "750"). Further, as described above, the test module 502 may compare the percentage of duplicate bytes read with a predetermined threshold (e.g., 70%) to identify whether the job is optimized by utilizing a cache. The predetermined threshold may be configured.

Figure 8B:
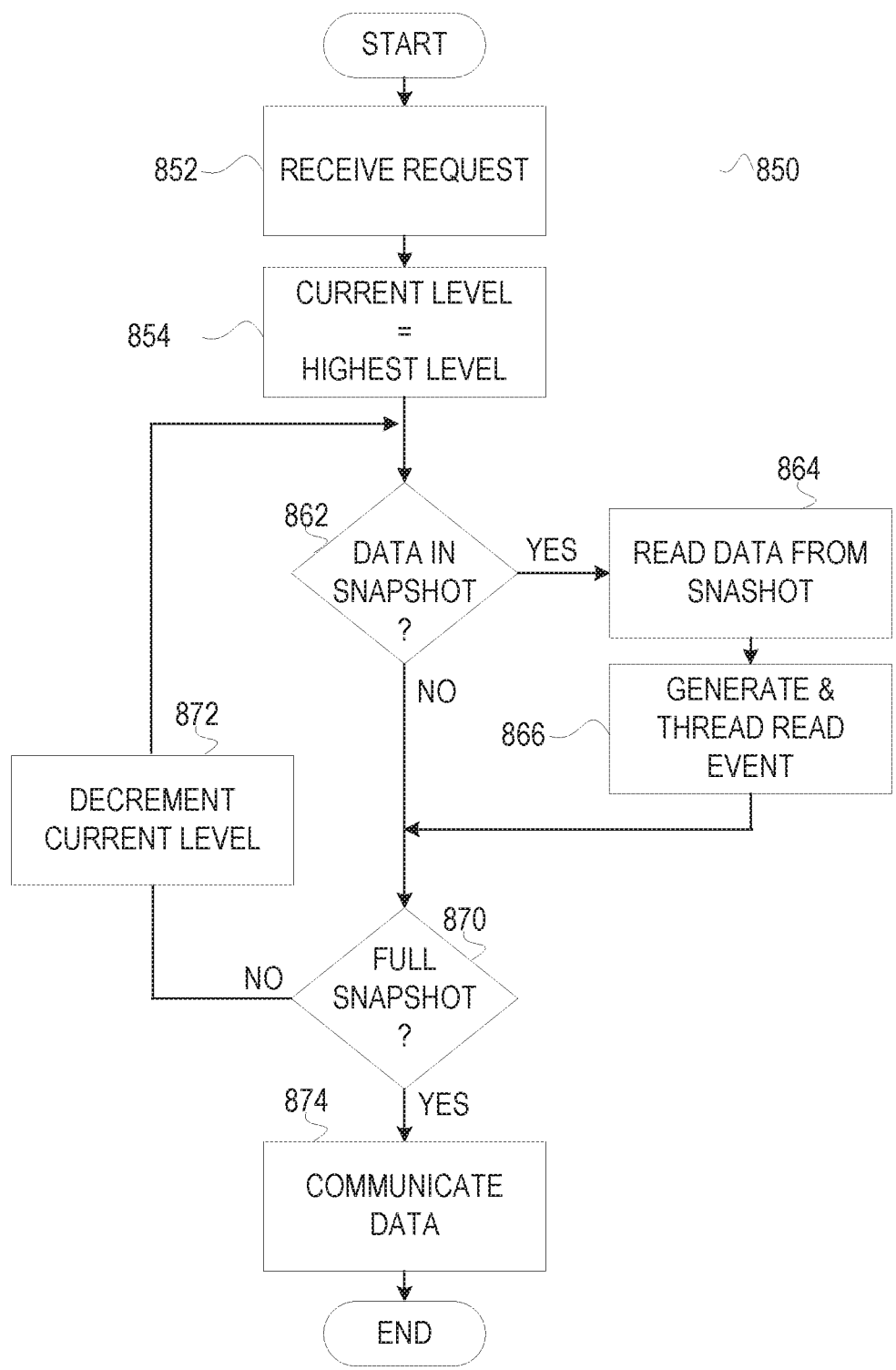
FIG. 8B is a block diagram illustrating a method, according to an embodiment.

FIG. 8B is a block diagram illustrating a method 850, according to an embodiment, to generate and thread read events 604. The method 850 is performed by the test module 502 and describes, in greater detail, the processing in operations 802, 803 and 804 on FIG. 8A. At operation 852, the method 850 commences with the test module 502 receiving a read request 202 from the job module 112. At operation 854 the test module 502 registers the current level as the highest level based on the number of incremental snapshots 210 in the snapshot information 122 being utilized by the job module 112. For example, if the snapshot information 122 includes three incremental snapshots 210, then the highest level is level 206 "3" and the test module 502 registers the current level as level 206 "3." Further for example, if the snapshot information 122 includes five incremental snapshots 210, then the highest level is "5" and the test module 502 registers the current level as level 206 "5."

At decision operation 862 the test module 502 identifies whether the snapshot 306 at the current level stores data 328 for any of the locations identified by the offset 326 and the length 330 in the read request 202.

First Entrance, Incremental Snapshot

If the current level identifies an incremental snapshot 210, then the test module 502 compares the offset 326 and the length 330 in the read request 202 with the offset 326 and the data 328 in each of the change information 324 elements in the incremental snapshot 210. If data 328 in a change information 324 element is identified as being registered to any of the locations being specified by the offset 326 and length 330 in the read request 202, then the test module 502 identifies at least a portion of the data 328 being requested is stored in the snapshot 306 and a branch is made to operation 864. Otherwise, a branch is made to decision operation 870.

First Entrance, Full Snapshot

If the current level identifies a full snapshot 208, then the test module 502 then the test module 502 identifies the data 328 being requested as being stored in the full snapshot 208 and a branch is made to operation 864. Otherwise, a branch is made to decision operation 870.

Subsequent Entrances

On subsequent entries to operation 862 for the same read request 202, the test module 502 identifies whether part of the read request 202 was read from snapshots 210 at prior levels. If, for example, the read request 202 includes an offset 326 of "2" and a length of "17," and storage locations "2-16" were previously read from the incremental snapshot 210 at level 206 "3" (e.g.,"I-3") leaving storage locations "17-18" not yet read, and the current level is "2" (e.g., "I-2"), then the test module 502 identifies whether locations "17-18" may be read from the incremental snapshot 210 at the current level.

At operation 864, the test module 502 reads the data 328 or a portion of the data 328 from the snapshot 306 as described above. At operation 866, the test module 502 generates, initializes, and stores a read event 604 in the read event information 504 based on the data 328 or the portion of data 328 read from the snapshot 306. For example, test module 502 stores an offset 326 and length 330 in the read event 604 describing the data 328 or a portion of the data 328 read from the snapshot 306. In addition, the test module 502 threads the read event 604 onto the linked list base in accordance with a level 206 specified by the current level.

At decision operation 870 the test module 502 identifies whether the snapshot 306 at the current level is a full snapshot 208. If the snapshot 306 is a full snapshot 208, then a branch is made to operation 874. Otherwise, a branch is made to operation 872. At operation 872, the test module 502 decrements the current level by "1." At operation 874, the test module 502 communicates the data 328 read from the snapshot information 122 to the job module 112.

Figure 8C:
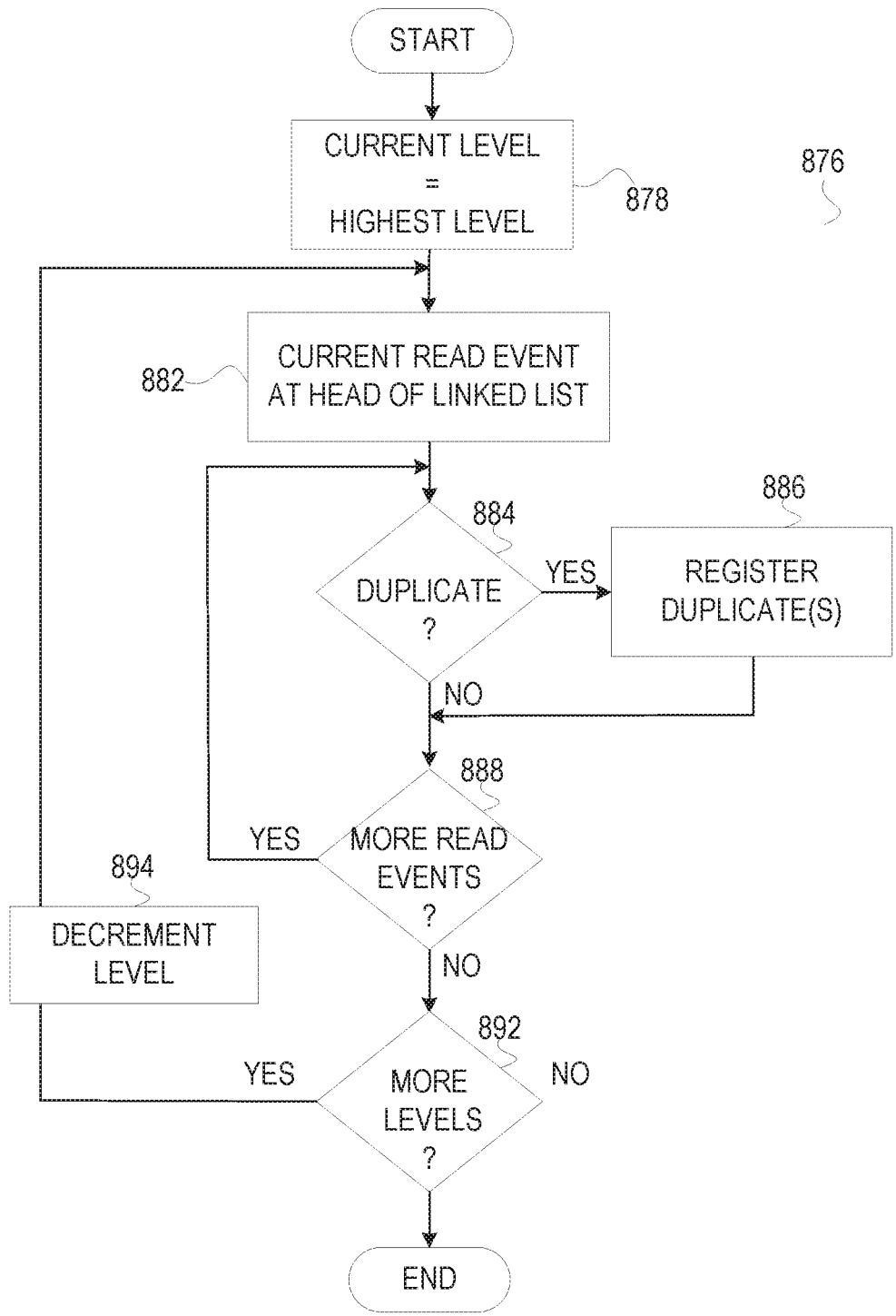
FIG. 8C is a block diagram illustrating a method, according to an embodiment, to aggregate read events.

FIG. 8C is a block diagram illustrating a method 876, according to an embodiment, to aggregate read events 604. The method 876 is performed by the test module 502. The method 876 describes in more detail the operation 805 on FIG. 8A. Returning to FIG. 8C, at operation 878, the method 876 commences with the test module 502 registering a current level based on the highest level of incremental snapshots 210 in the snapshot information 122. For example, if the snapshot information 122 includes three incremental snapshots 210, then the highest level is "3" and the test module 502 registers the current level as "3." Further for example, if the snapshot information 122 includes five incremental snapshots 210, then the highest level is "5" and the test module 502 registers the current level as "5." At operation 882, the test module 502 registers current read event as the read event 604 pointed to by the head cell for the current level.

At decision operation 884 the test module 502 identifies whether a pair of read events 604 are duplicates. For example, the test module 502 may identify whether a pair of read events 604 are duplicates as described in association with FIG. 6A. Returning to FIG. 8C, if the test module 502 identifies a pair of read events 604 are duplicates, then a branch is made to operation 886. Otherwise a branch is made to decision operation 888. At operation 886 the test module 502 registers one or two read events 604 as duplicates, as previously described in association with FIG. 6A. Returning to FIG. 8C, for example, the test module 502 may assert (e.g., "1") the duplicate flag 650 in the read event(s) 604 to register the read event(s) as duplicate(s). At decision operation 888, the test module 502 identifies whether there are more read events 604 in the linked list. For example, the test module 502 identifies another read event 604 in the linked list by following the linked list until a read event 604 is identified with a duplicate flag 650 not asserted (not a duplicate). If the test module 502 identifies a read event 604 with a duplicate flag 650 not asserted (not a duplicate) then the test module 502 branches to decision operation 884. Otherwise the test module 502 branches to decision operation 892.

At decision operation 892, the test module 502 identifies whether there are more levels 206 (e.g., snapshots 306) in the snapshot information 122, if there are no more levels 206 in the snapshot information 122, then the method 876 ends. Otherwise the test module 502 branches to decision operation 894.

Figure 9A:
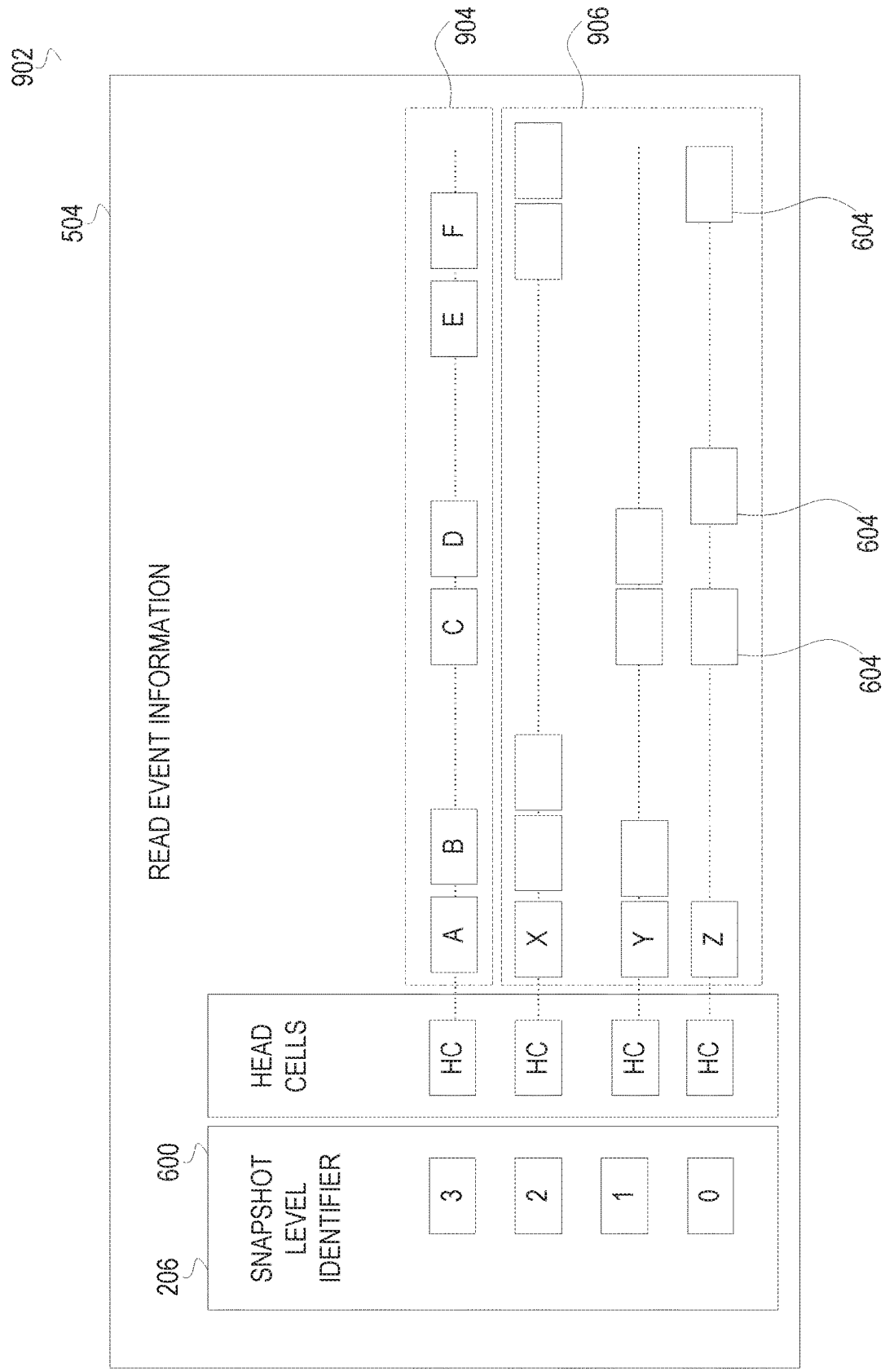
FIG. 9A is a block diagram illustrating an example, according to an embodiment, of a percentage early read metric.

FIG. 9A is a block diagram illustrating an example 900, according to an embodiment, of a percentage early read metric. For example, the percentage early read metric may include a percentage of early reads. The percentage of early reads may be computed and compared with a predetermined threshold to determine whether utilizing a cache optimizes a job. The percentage of early reads may be computed based on the read events 604 stored in the read event information 504 (e.g., first plurality of read events). The percentage of early reads is computationally cheaper than the solutions described above. The percentage of early reads is computed by utilizing a numerator including a count of read events 604 corresponding to reads from all snapshots 306 other than the most recent incremental snapshot 210 and a denominator including a count of read events 604 corresponding to reads from all snapshots 306. For example, if the percentage early reads (e.g., 70%) for a job is less than a predetermined threshold (e.g., 95%), then the job is not optimized by using a cache. The example 900 includes latest read event information 904 and early read event information 906. The latest read event information 904 includes read events 604 corresponding to reads from the latest incremental snapshot 210 (e.g., most recent) (e.g., snapshot level 3) (e.g., "I-3"). The early read event information 906 includes read events 604 corresponding to reads from snapshots 306 (e.g., incremental snapshot(s) 210 and full snapshot 208) other than the latest incremental snapshot 210 (e.g., most recent) (e.g., snapshot level 3) (e.g., "I-3"). The percentage of early reads is computed by dividing a count of the read events in the early read event information 906 with a count of total read events 604. The count of total read events 604 is computed by counting all of the read events 604 in the read event information 504.

Figure 9B:
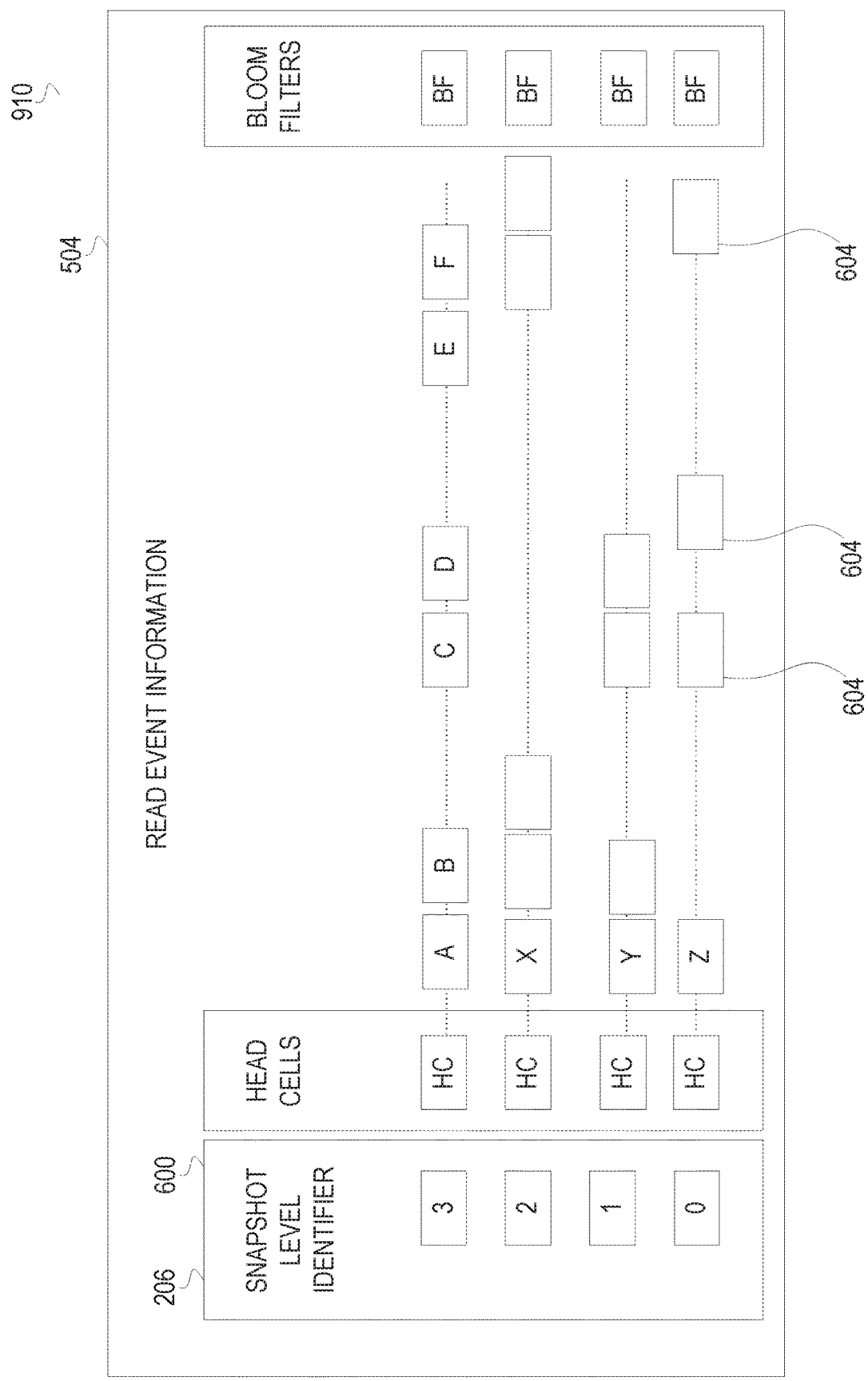
FIG. 9B is a block diagram illustrating an example, according to an embodiment, of bloom filters.

FIG. 9B is a block diagram illustrating an example 900, according to an embodiment, of bloom filters. A bloom filter, as is known in the art, is a space-efficient probabilistic data structure that is used to test whether an element is a member of a set. A bloom filter may be utilized to identify read events 604 with the same offsets 326 as duplicates. The example 900 illustrates a bloom filter corresponding to each level 206 (e.g., snapshot 306). An offset 326 in a read event 604 may be registered as an entry in a bloom filter, as well as every offset corresponding to the length of data 328 contained in the read event, responsive to reading data from a snapshot 306. For example, if the read event is at offset 10 and data of length 5, then offsets 10, 11, 12, 13, and 14 will all be added to the bloom filter, if they are not already present. In addition, the bloom filter may be utilized to identify whether an offset (or multiple offsets in a read of size greater than one) 326 in a subsequent read event 604 is a duplicate. For example, at operation 866 in FIG. 88, the test module 502 identifies whether an offset 326 in a read event 604 was previously stored in the bloom filter corresponding to the current level (e.g., level 206) (e.g., snapshot 306), as well as all subsequent offsets corresponding to the length of data 328. For every offset corresponding to the offset 326 and length of data 328 was previously stored in the bloom filter, then a counter of duplicate read offsets for the snapshot 306 is incremented and a counter of total read offsets for the snapshot 306 is incremented. Otherwise, a counter of total read offsets for the snapshot 306 is incremented and the offset is stored in the bloom filter. To further optimize space usage of the bloom filter, offsets can be grouped into bins of larger size (rather than having a single entry per offset), and thus a data range of arbitrary size can be split into a reduced number of entries in the bloom filter.

Further, a percentage of duplicate read offsets may be computed based on the number duplicate read offsets for each of the snapshots 306 and the number of total read offsets for each of the snapshots 306. For example, the percentage of duplicate read offsets is computed by: 1) aggregating the number of duplicate read offsets for each of the snapshots 306 to generate duplicated read offsets, 2) aggregating the number of total read offsets for each of the snapshots 306 to generate total read offsets, and 3) dividing the duplicated read offsets by the total read offsets to generate a percentage of duplicate read offsets.

It will be appreciated by those skilled in the art that bloom filters are utilized to identify whether an element is "possibly in set" (e.g., possible false positives) or "definitely not in set." Nevertheless, the possible false positives may be minimized by configuring additional storage space for a bloom filter. Accordingly, the additional storage space minimizes the possible false positives resulting in more accurate estimates.

Figure 10A:
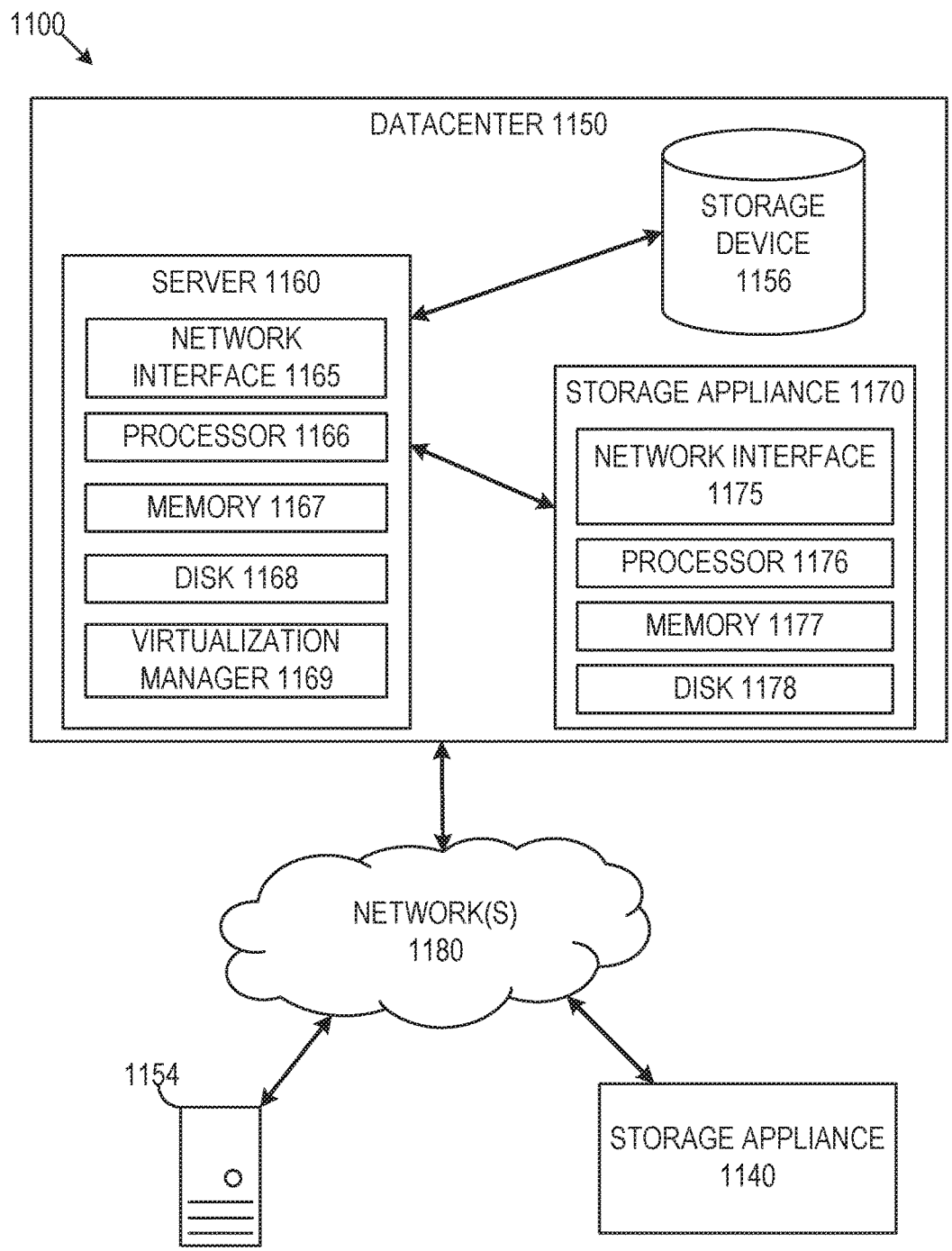
FIG. 10A is a block diagram illustrating a networked computing environment, according to an embodiment.

FIG. 10A depicts one embodiment of a networked computing environment 1100 in which the disclosed technology may be practiced. As depicted, the networked computing environment 1100 includes a data center 1150, a storage appliance 1140, and a computing device 1154 in communication with each other via one or more networks 1180. The networked computing environment 1100 may include a plurality of computing devices interconnected through one or more networks 1180. The one or more networks 1180 may allow computing devices and/or storage devices to connect to and communicate with other computing devices and/or other storage devices. In some cases, the networked computing environment 1100 may include other computing devices and/or other storage devices not shown. The other computing devices may include, for example, a mobile computing device, a non-mobile computing device, a server, a work-station, a laptop computer, a tablet computer, a desktop computer, or an information processing system. The other storage devices may include, for example, a storage area network storage device, a networked-attached storage device, a hard disk drive, a solid-state drive, or a data storage system.

The data center 1150 may include one or more servers, such as server 1160, in communication with one or more storage devices, such as storage device 1156. The one or more servers may also be in communication with one or more storage appliances, such as storage appliance 1170. The server 1160, storage device 1156, and storage appliance 1170 may be in communication with each other via a networking fabric connecting servers and data storage units within the data center 1150 to each other. The storage appliance 1170 may include a data management system for backing up virtual machines and/or files within a virtualized infrastructure. The server 1160 may be used to create and manage one or more virtual machines associated with a virtualized infrastructure.

The one or more virtual machines may run various applications, such as a database application or a web server. The storage device 1156 may include one or more hardware storage devices for storing data, such as a hard disk drive (HDD), a magnetic tape drive, a solid-state drive (SSD), a storage area network (SAN) storage device, or a networked-attached storage (NAS) device. In some cases, a data center, such as data center 1150, may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 1180 may include a secure network such as an enterprise private network, an unsecure network such as a wireless open network, a local area network (LAN), a wide area network (WAN), and the Internet. The one or more networks 1180 may include a cellular network, a mobile network, a wireless network, or a wired network. Each network of the one or more networks 1180 may include hubs, bridges, routers, switches, and wired transmission media such as a direct-wired connection. The one or more networks 1180 may include an extranet or other private network for securely sharing information or providing controlled access to applications or files.

A server, such as server 1160, may allow a client to download information or files (e.g., executable, text, application, audio, image, or video files) from the server or to perform a search query related to particular information stored on the server. In some cases, a server may act as an application server or a file server. In general, a server may refer to a hardware device that acts as the host in a client-server relationship or a software process that shares a resource with or performs work for one or more clients.

One embodiment of server 1160 includes a network interface 1165, processor 1166, memory 1167, disk 1168, and virtualization manager 1169 all in communication with each other. Network interface 1165 allows server 1160 to connect to one or more networks 1180. Network interface 1165 may include a wireless network interface and/or a wired network interface. Processor 1166 allows server 1160 to execute computer-readable instructions stored in memory 1167 in order to perform processes described herein. Processor 1166 may include one or more processing units, such as one or more CPUs and/or one or more GPUs. Memory 1167 may comprise one or more types of memory (e.g., RAM, SRAM, DRAM, ROM, EEPROM, Flash, etc.). Disk 1168 may include a hard disk drive and/or a solid-state drive. Memory 1167 and disk 1168 may comprise hardware storage devices.

The virtualization manager 1169 may manage a virtualized infrastructure and perform management operations associated with the virtualized infrastructure. The virtualization manager 1169 may manage the provisioning of virtual machines running within the virtualized infrastructure and provide an interface to computing devices interacting with the virtualized infrastructure. In one example, the virtualization manager 1169 may set a virtual machine into a frozen state in response to a snapshot request made via an application programming interface (API) by a storage appliance, such as storage appliance 1170. Setting the virtual machine into a frozen state may allow a point-in-time snapshot of the virtual machine to be stored or transferred. In one example, updates made to a virtual machine that has been set into a frozen state may be written to a separate file (e.g., an update file) while the virtual machine may be set into a read-only state to prevent modifications to the virtual disk file while the virtual machine is in the frozen state.

The virtualization manager 1169 may then transfer data associated with the virtual machine (e.g., an image of the virtual machine or a portion of the image of the virtual disk file associated with the state of the virtual disk at the point in time is frozen) to a storage appliance in response to a request made by the storage appliance. After the data associated with the point-in-time snapshot of the virtual machine has been transferred to the storage appliance 1170, the virtual machine may be released from the frozen state (i.e., unfrozen) and the updates made to the virtual machine and stored in the separate file may be merged into the virtual disk file. The virtualization manager 1169 may perform various virtual machine-related tasks, such as cloning virtual machines, creating new virtual machines, monitoring the state of virtual machines, moving virtual machines between physical hosts for load balancing purposes, and facilitating backups of virtual machines.

One embodiment of storage appliance 1170 includes a network interface 1175, processor 1176, memory 1177, and disk 1178 all in communication with each other. Network interface 1175 allows storage appliance 1170 to connect to one or more networks 1180. Network interface 1175 may include a wireless network interface and/or a wired network interface. Processor 1176 allows storage appliance 1170 to execute instructions stored in memory 1177 in order to perform processes described herein. Processor 1176 may include one or more processing units, such as one or more CPUs and/or one or more GPUs. Memory 1177 may comprise one or more types of memory (e.g., RAM, SRAM, DRAM, ROM, EEPROM, NOR Flash, NAND Flash, etc.). Disk 1178 may include a hard disk drive and/or a solid-state drive. Memory 1177 and disk 1178 may comprise hardware storage devices.

In one embodiment, the storage appliance 1170 may include four machines. Each of the four machines may include a multi-core CPU, 64 GB of RAM, a 400 GB SSD, three 4 TB HDDs, and a network interface controller. In this case, the four machines may be in communication with the one or more networks 1180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point-in-time versions of 1000 virtual machines. The networked computing environment 1100 may provide a cloud computing environment for one or more computing devices. Cloud computing may refer to Internet-based computing, wherein shared resources, software, and/or information may be provided to one or more computing devices on-demand via the Internet. The networked computing environment 1100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one embodiment, the networked computing environment 1100 may include a virtualized infrastructure that provides software, data processing, and/or data storage services to end users accessing the services via the networked computing environment 1100. In one example, networked computing environment 1100 may provide cloud-based work productivity or business-related applications to a computing device, such as computing device 1154, The storage appliance 1140 may comprise a cloud-based data management system for backing up virtual machines and/or files within a virtualized infrastructure, such as virtual machines running on server 1160 or files stored on server 1160.

In some cases, networked computing environment 1100 may provide remote access to secure applications and files stored within data center 1150 from a remote computing device, such as computing device 1154. The data center 1150 may use an access control application to manage remote access to protected resources, such as protected applications, databases, or files located within the data center. To facilitate remote access to secure applications and files, a secure network connection may be established using a virtual private network (VPN). A VPN connection may allow a remote computing device, such as computing device 1154, to securely access data from a private network (e.g., from a company file server or mail server) using an unsecure public network or the Internet. The VPN connection may require client-side software (e.g., running on the remote computing device) to establish and maintain the VPN connection. The VPN client software may provide data encryption and encapsulation prior to the transmission of secure private network traffic through the Internet.

In some embodiments, the storage appliance 1170 may manage the extraction and storage of virtual machine snapshots associated with different point-in-time versions of one or more virtual machines running within the data center 1150. A snapshot of a virtual machine may correspond with a state of the virtual machine at a particular point in time. In response to a restore command from the server 1160, the storage appliance 1170 may restore a point-in-time version of a virtual machine or restore point-in-time versions of one or more files located on the virtual machine and transmit the restored data to the server 1160. In response to a mount command from the server 1160, the storage appliance 1170 may allow a point-in-time version of a virtual machine to be mounted and allow the server 1160 to read and/or modify data associated with the point-in-time version of the virtual machine. To improve storage density, the storage appliance 1170 may deduplicate and compress data associated with different versions of a virtual machine and/or deduplicate and compress data associated with different virtual machines. To improve system performance, the storage appliance 1170 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point-in-time snapshot of the virtual machine (e.g., the forward incremental file may be combined with the last full image of the virtual machine that was captured before the forward incremental was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 1170 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 1170 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 1170 may run an Network file System (NFS) server and make the particular version (or a copy of the particular version) of the virtual machine accessible for reading and/or writing. The end user of the storage appliance 1170 may then select the particular version to be mounted and run an application (e.g., a data analytics application) using the mounted version of the virtual machine. In another example, the particular version may be mounted as an iSCSI target.

Figure 10B:
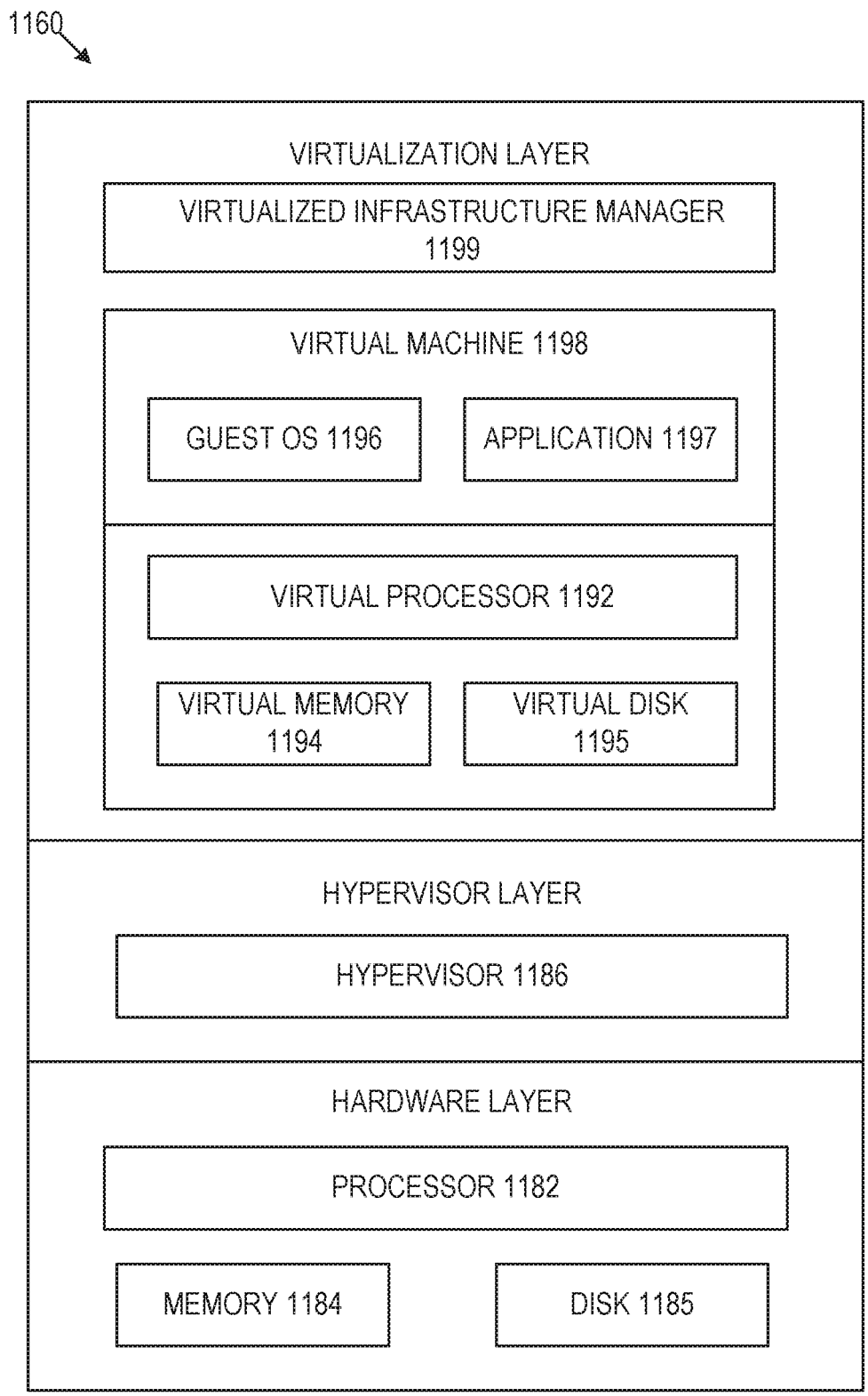
FIG. 10B is a block diagram illustrating a server, according to an embodiment.

FIG. 10B depicts one embodiment of server 1160 in FIG. 10A. The server 1160 may comprise one server out of a plurality of servers that are networked together within a data center (e.g., data center 1150). In one example, the plurality of servers may be positioned within one or more server racks within the data center. As depicted, the server 1160 includes hardware-level components and software-level components. The hardware-level components include one or more processors 1182, one or more memory 1184, and one or more disks 1185. The software-level components include a hypervisor 1186, a virtualized infrastructure manager 1199, and one or more virtual machines, such as virtual machine 1198. The hypervisor 1186 may comprise a native hypervisor or a hosted hypervisor. The hypervisor 1186 may provide a virtual operating platform for running one or more virtual machines, such as virtual machine 1198. Virtual machine 1198 includes a plurality of virtual hardware devices including a virtual processor 1192, a virtual memory 1194, and a virtual disk 1195. The virtual disk 1195 may comprise a file stored within the one or more disks 1185. In one example, a virtual machine 1198 may include a plurality of virtual disks, with each virtual disk of the plurality of virtual disks associated with a different file stored on the one or more disks 1185. Virtual machine 1198 may include a guest operating system 1196 that runs one or more applications, such as application 1197.

The virtualized infrastructure manager 1199, which may correspond with the virtualization manager 1169 in FIG. 10A, may run on a virtual machine or natively on the server 1160. The virtualized infrastructure manager 1199 may provide a centralized platform for managing a virtualized infrastructure that includes a plurality of virtual machines. The virtualized infrastructure manager 1199 may manage the provisioning of virtual machines running within the virtualized infrastructure and provide an interface to computing devices interacting with the virtualized infrastructure. The virtualized infrastructure manager 1199 may perform various virtualized infrastructure related tasks, such as cloning virtual machines, creating new virtual machines, monitoring the state of virtual machines, and facilitating backups of virtual machines.

In one embodiment, the server 1160 may use the virtualized infrastructure manager 1199 to facilitate backups for a plurality of virtual machines (e.g., eight different virtual machines) running on the server 1160. Each virtual machine running on the server 1160 may run its own guest operating system and its own set of applications. Each virtual machine running on the server 1160 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 1140 in FIG. 10A or storage appliance 1170 in FIG. 10A, may request a snapshot of a virtual machine running on the server 1160. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time and a second snapshot of the virtual machine may correspond with a second state of the virtual machine at a second point in time subsequent to the first point in time.

In response to a request for a snapshot of a virtual machine at a particular point in time, the virtualized infrastructure manager 1199 may set the virtual machine into a frozen state or store a copy of the virtual machine at the particular point in time. The virtualized infrastructure manager 1199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 1199 may transfer a full image of the virtual machine to the storage appliance or a plurality of data blocks corresponding with the full image (e.g., to enable a full image-level backup of the virtual machine to be stored on the storage appliance). In other cases, the virtualized infrastructure manager 1199 may transfer a portion of an image of the virtual machine associated with data that has changed since an earlier point in time prior to the particular point in time or since a last snapshot of the virtual machine was taken. In one example, the virtualized infrastructure manager 1199 may transfer only data associated with virtual blocks stored on a virtual disk of the virtual machine that have changed since the last snapshot of the virtual machine was taken. In one embodiment, the data management application may specify a first point in time and a second point in time and the virtualized infrastructure manager 1199 may output one or more virtual data blocks associated with the virtual machine that have been modified between the first point in time and the second point in time.

In some embodiments, the server 1160 or the hypervisor 1186 may communicate with a storage appliance, such as storage appliance 1140 in FIG. 10A or storage appliance 1170 in FIG. 10A, using a distributed file system protocol such as Network File System (NTS) Version 3. The distributed file system protocol may allow the server 1160 or the hypervisor 1186 to access, read, write, or modify files stored on the storage appliance 1140/1170 as if the files were locally stored on the server 1160. The distributed file system protocol may allow the server 1160 or the hypervisor 1186 to mount a directory or a portion of a file system located within the storage appliance 1140/1170.

Figure 10C:
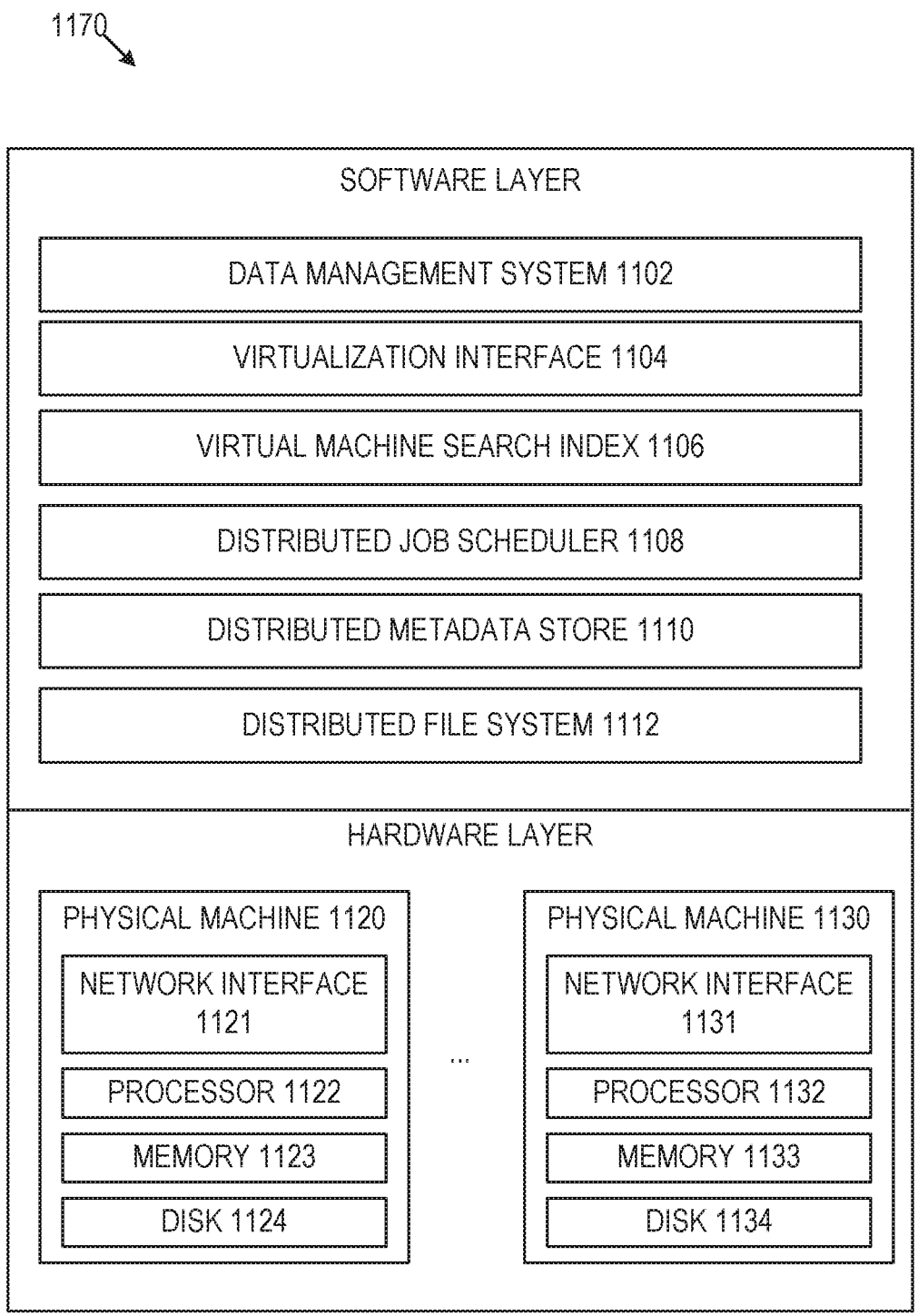
FIG. 10C is a block diagram illustrating a server storage appliance, according to an embodiment.

FIG. 10C depicts one embodiment of storage appliance 1170 in FIG. 10A. The storage appliance 1170 may include a plurality of physical machines that may be grouped together and presented as a single computing system. Each physical machine of the plurality of physical machines may comprise a node in a cluster (e.g., a failover cluster). In one example, the storage appliance 1170 may be positioned within a server rack within a data center. As depicted, the storage appliance 1170 includes hardware-level components and software-level components. The hardware-level components include one or more physical machines, such as physical machine 1120 and physical machine 1130. The physical machine 1120 includes a network interface 1121, processor 1122, memory 1123, and disk 1124 all in communication with each other. Processor 1122 allows physical machine 1120 to execute computer-readable instructions stored in memory 1123 to perform processes described herein. Disk 1124 may include a hard disk drive and/or a solid-state drive. The physical machine 1130 includes a network interface 1131, processor 1132, memory 1133, and disk 1134 all in communication with each other. Processor 1132 allows physical machine 1130 to execute computer-readable instructions stored in memory 1133 to perform processes described herein. Disk 1134 may include a hard disk drive and/or a solid-state drive. In some cases, disk 1134 may include a flash-based SSD or a hybrid. HDD/SSD drive. In one embodiment, the storage appliance 1170 may include a plurality of physical machines arranged in a cluster (e.g., eight machines in a cluster). Each of the plurality of physical machines may include a plurality of multi-core CPUs, 128 GB of RAM, a 500 GB SSD, four 4 TB HDDs, and a network interface controller.

In some embodiments, the plurality of physical machines may be used to implement a cluster-based network file-server. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 1160 in FIG. 10A, or a hypervisor, such as hypervisor 1186 in FIG. 10B, to communicate with the storage appliance 1170 may not provide a failover mechanism (e.g., NFS Version 3). In the case that no failover mechanism is provided on the client side, the hypervisor may not be able to connect to a new node within a cluster in the event that the node connected to the hypervisor fails.

in some embodiments, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 1186 in FIG. 10B, may be configured with a first floating IP address associated with a first node in the cluster. The hypervisor may connect to the cluster using the first floating IP address. In one example, the hypervisor may communicate with the cluster using the NTS Version 3 protocol.

Each node in the cluster may run a Virtual Router Redundancy Protocol (VRRP) daemon. A daemon may comprise a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N-1), for a floating IP address (i), the VRRP priority of nodeG) may be G-i) modulo N. In another example, given a number (N) of nodes in a cluster from node(0) to node(N-1), for a floating IP address (i), the VRRP priority of nodeG) may be (i-j) modulo N. In these cases, nodeG) will assume floating IP address (i) only if its VRRP priority is higher than that of any other node in the cluster that is alive and announcing itself on the network. Thus, if a node fails, then there may be a clear priority ordering for determining which other node in the cluster will take over the failed node's floating IP address.

In some cases, a cluster may include a plurality of nodes and each node of the plurality of nodes may be assigned a different floating IP address. In this case, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 10C, the software-level components of the storage appliance 1170 may include data management system 1102, a virtualization interface 1104, a distributed job scheduler 1108, a distributed metadata store 1110, a distributed file system 1112, and one or more virtual machine search indexes, such as virtual machine search index 1106. In one embodiment, the software-level components of the storage appliance 1170 may be run using a dedicated hardware-based appliance, in another embodiment, the software-level components of the storage appliance 1170 may be run from the cloud (e.g., the software-level components may be installed on a cloud service provider).

In some cases, the data storage across a plurality of nodes in a cluster (e.g., the data storage available from the one or more physical machines) may be aggregated and made available over a single file system namespace (e.g., /snapshots/). A directory for each virtual machine protected using the storage appliance 1170 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed file system 1112 may present itself as a single file system, in which as new physical machines or nodes are added to the storage appliance 1170, the cluster may automatically discover the additional nodes and automatically increase the available capacity of the file system for storing files and other data. Each file stored in the distributed file system 1112 may be partitioned into one or more chunks or shards. Each of the one or more chunks may be stored within the distributed file system 1112 as a separate file. The files stored within the distributed file system 1112 may be replicated or mirrored over a plurality of physical machines, thereby creating a load-balanced and fault-tolerant distributed file system. In one example, storage appliance 1170 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 1110 may include a distributed database management system that provides high availability without a single point of failure. In one embodiment, the distributed metadata store 1110 may comprise a database, such as a distributed document-oriented database. The distributed metadata store 1110 may be used as a distributed key value storage system. In one example, the distributed metadata store 1110 may comprise a distributed NoSQL key value store database. In some cases, the distributed metadata store 1110 may include a partitioned row store, in which rows are organized into tables or other collections of related data held within a structured format within the key value store database. A table (or a set of tables) may be used to store metadata information associated with one or more files stored within the distributed file system 1112. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 1112 and metadata associated with the new file may be stored within the distributed metadata store 1110. The distributed metadata store 1110 may also be used to store a backup schedule for the virtual machine and a list of snapshots for the virtual machine that are stored using the storage appliance 1170.

In some cases, the distributed metadata store 1110 may be used to manage one or more versions of a virtual machine. Each version of the virtual machine may correspond with a full image snapshot of the virtual machine stored within the distributed file system 1112 or an incremental snapshot of the virtual machine (e.g., a forward incremental or reverse incremental) stored within the distributed file system 1112. In one embodiment, the one or more versions of the virtual machine may correspond with a plurality of files. The plurality of files may include a single full image snapshot of the virtual machine and one or more incrementals derived from the single full image snapshot. The single full image snapshot of the virtual machine may be stored using a first storage device of a first type (e.g., a HDD) and the one or more incrementals derived from the single full image snapshot may be stored using a second storage device of a second type (e.g., an SSD). In this case, only a single full image needs to be stored and each version of the virtual machine may be generated from the single full image or the single full image combined with a subset of the one or more incrementals. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incrementals.

The distributed job scheduler 1108 may be used for scheduling backup jobs that acquire and store virtual machine snapshots for one or more virtual machines over time. The distributed job scheduler 1108 may follow a backup schedule to back up an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. Each backup job may be associated with one or more tasks to be performed in a sequence. Each of the one or more tasks associated with a job may be run on a particular node within a duster. In some cases, the distributed job scheduler 1108 may schedule a specific job to be run on a particular node based on data stored on the particular node. For example, the distributed job scheduler 1108 may schedule a virtual machine snapshot job to be run on a node in a cluster that is used to store snapshots of the virtual machine in order to reduce network congestion.

The distributed job scheduler 1108 may comprise a distributed fault-tolerant job scheduler, in which jobs affected by node failures are recovered and rescheduled to be run on available nodes. In one embodiment, the distributed job scheduler 1108 may be fully decentralized and implemented without the existence of a master node. The distributed job scheduler 1108 may run job scheduling processes on each node in a cluster or on a plurality of nodes in the cluster. In one example, the distributed job scheduler 1108 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 1110. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 1108 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 1108 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 1108 may ensure that each task of the series of tasks is executed based on the ordering of tasks. Tasks that do not have dependencies with each other may be executed in parallel.

In some cases, the distributed job scheduler 1108 may schedule each task of a series of tasks to be performed on a specific node in a cluster. In other cases, the distributed job scheduler 1108 may schedule a first task of the series of tasks to be performed on a first node in a cluster and a second task of the series of tasks to be performed on a second node in the cluster. In these cases, the first task may have to operate on a first set of data (e.g., a first file stored in a file system) stored on the first node and the second task may have to operate on a second set of data (e.g., metadata related to the first file that is stored in a database) stored on the second node, in some embodiments, one or more tasks associated with a job may have an affinity to a specific node in a cluster.

In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 1108 may assign one or more tasks associated with a job to be executed on a particular node in a cluster based on the location of data required to be accessed by the one or more tasks.

In one embodiment, the distributed job scheduler 1108 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 1199 in FIG. 10B, to create a frozen copy of the virtual machine and to transfer one or more chunks (or one or more files) associated with the frozen copy to a storage appliance, such as storage appliance 1170 in FIG. 10A. The one or more tasks may also include generating metadata for the one or more chunks, storing the metadata using the distributed metadata store 1110, storing the one or more chunks within the distributed file system 1112, and communicating with the virtualized infrastructure manager that the frozen copy of the virtual machine may be unfrozen or released from a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 1112 (e.g., the first chunk is located at /snapshotsNM_B/s1/s1.chunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption-related tasks.

The virtualization interface 1104 may provide an interface for communicating with a virtualized infrastructure manager managing a virtualization infrastructure, such as virtualized infrastructure manager 1199 in FIG. 10B, and requesting data associated with virtual machine snapshots from the virtualization infrastructure. The virtualization interface 1104 may communicate with the virtualized infrastructure manager using an API for accessing the virtualized infrastructure manager (e.g., to communicate a request for a snapshot of a virtual machine). In this case, storage appliance 1170 may request and receive data from a virtualized infrastructure without requiring agent software to be installed or running on virtual machines within the virtualized infrastructure. The virtualization interface 1104 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance. However, if the snapshot of the virtual machine is not the first snapshot taken of the virtual machine, then only the data blocks of the virtual machine that have changed since a prior snapshot was taken may be transferred to the storage appliance.

The virtual machine search index 1106 may include a list of files that have been stored using a virtual machine and a version history for each of the files in the list. Each version of a file may be mapped to the earliest point-in-time snapshot of the virtual machine that includes the version of the file or to a snapshot of the virtual machine that includes the version of the file (e.g., the latest point-in-time snapshot of the virtual machine that includes the version of the file). In one example, the virtual machine search index 1106 may be used to identify a version of the virtual machine that includes a particular version of a file (e.g., a particular version of a database, a spreadsheet, or a word processing document). In some cases, each of the virtual machines that are backed up or protected using storage appliance 1170 may have a corresponding virtual machine search index.

In one embodiment, as each snapshot of a virtual machine is ingested, each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some cases, if a virtual machine includes a plurality of virtual disks, then a virtual machine search index may be generated for each virtual disk of the plurality of virtual disks. For example, a first virtual machine search index may catalog and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 1112 in FIG. 10C. The data management system 1102 may comprise an application running on the storage appliance that manages and stores one or more snapshots of a virtual machine. In one example, the data management system 1102 may comprise a highest-level layer in an integrated software stack running on the storage appliance. The integrated software stack may include the data management system 1102, the virtualization interface 1104, the distributed job scheduler 1108, the distributed metadata store 1110, and the distributed file system 1112.

In some cases, the integrated software stack may run on other computing devices, such as a server or computing device 1154 in FIG. 10A. The data management system 1102 may use the virtualization interface 1104, the distributed job scheduler 1108, the distributed metadata store 1110, and the distributed file system 1112 to manage and store one or more snapshots of a virtual machine. Each snapshot of the virtual machine may correspond with a point-in-time version of the virtual machine. The data management system 1102 may generate and manage a list of versions for the virtual machine. Each version of the virtual machine may map to or reference one or more chunks and/or one or more files stored within the distributed file system 1112. Combined together, the one or more chunks and/or the one or more files stored within the distributed file system 1112 may comprise a full image of the version of the virtual machine.

Machine and Software Architecture

The modules, methods, engines, applications, and so forth described in conjunction with FIGS. 1-9C are implemented in some embodiments in the context of multiple machines and associated software architectures. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "Internet of Things," while yet another combination produces a server computer for use within a cloud computing architecture. Not all combinations of such software and hardware architectures are presented here, as those of skill in the art can readily understand how to implement the disclosure in different contexts from the disclosure contained herein.

Software Architecture

Figure 11:
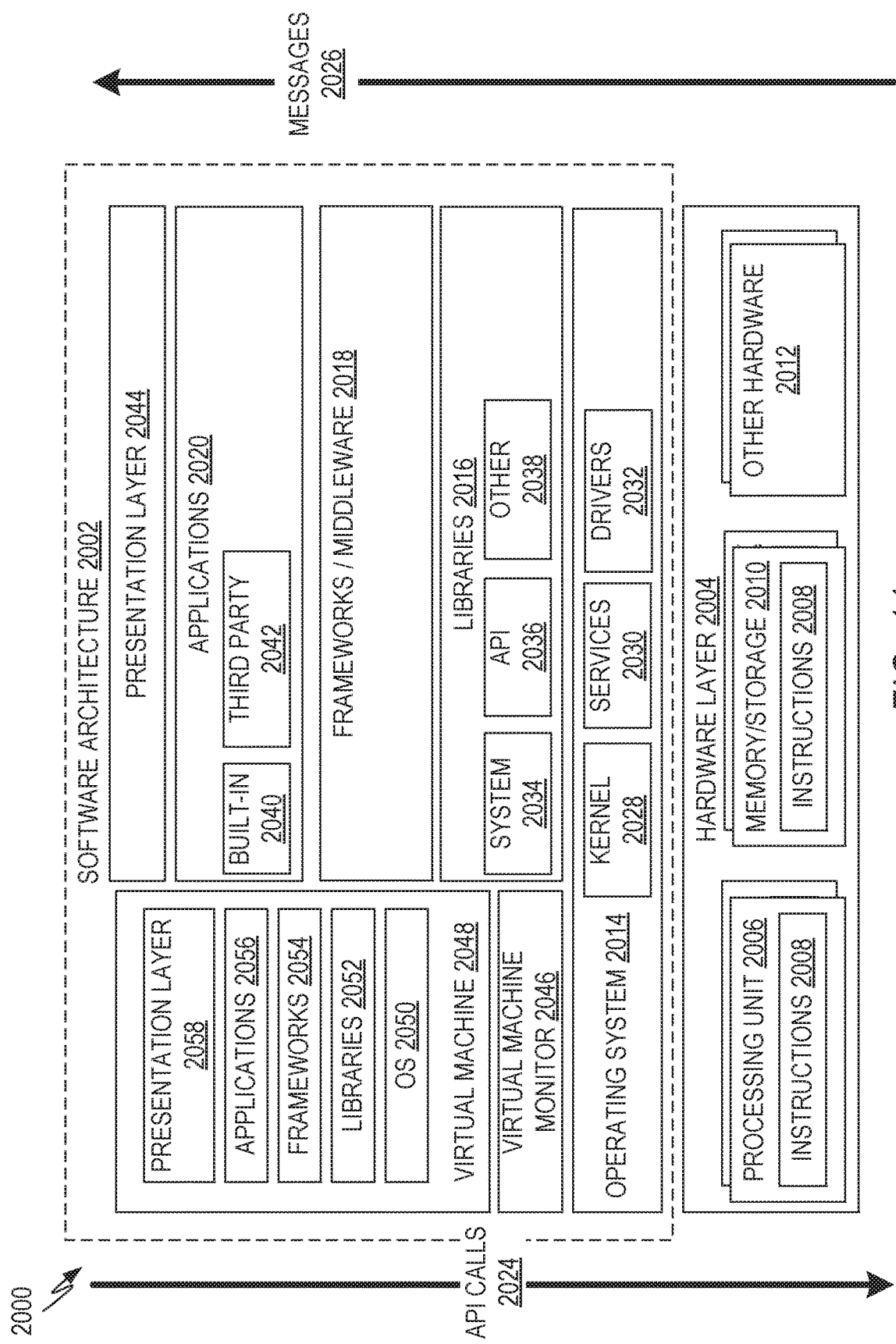
FIG. 11 is a block diagram illustrating a representative software architecture, according to an embodiment.

FIG. 11 is a block diagram 2000 illustrating a representative software architecture 2002, which may be used in conjunction with various hardware architectures herein described. FIG. 11 is merely a non-limiting example of a software architecture 2002, and it will be appreciated that many other architectures may be implemented to facilitate the functionality described herein. The software architecture 2002 may be executing on hardware such as a machine 2100 of FIG. 12 that includes, among other things, processors 2110, memory/storage 2130, and I/O components 2150. Returning to FIG. 11, a representative hardware layer 2004 is illustrated and can represent, for example, the machine 2100 of FIG. 12. The representative hardware layer 2004 comprises one or more processing units 2006 having associated executable instructions 2008. The executable instructions 2008 represent the executable instructions of the software architecture 2002, including implementation of the methods, engines, modules, and so forth of FIGS. 1-9C. The hardware layer 2004 also includes memory and/or storage modules 2010, which also have the executable instructions 2008. The hardware layer 2004 may also comprise other hardware 2012, which represents any other hardware of the hardware layer 2004, such as the other hardware 2012 illustrated as part of the machine 2100.

In the example architecture of FIG. 11, the software architecture 2002 may be conceptualized as a stack of layers where each layer provides particular functionality. For example, the software architecture 2002 may include layers such as an operating system 2014, libraries 2016, frameworks/middleware 2018, applications 2020, and a presentation layer 2044. Operationally, the applications 2020 and/or other components within the layers may invoke application programming interface (API) calls 2024 through the software stack and receive a response, returned values, and so forth, illustrated as messages 2026, in response to the API calls 2024. The layers illustrated are representative in nature, and not all software architectures have all layers. For example, some mobile or special purpose operating systems 2014 may not provide a frameworks/middleware 2018 layer, while others may provide such a layer. Other software architectures may include additional or different layers.

The operating system 2014 may manage hardware resources and provide common services. The operating system 2014 may include, for example, a kernel 2028, services 2030, and drivers 2032. The kernel 2028 may act as an abstraction layer between the hardware and the other software layers. For example, the kernel 2028 may be responsible for memory management, processor management (e.g., scheduling), component management, networking, security settings, and so on. The services 2030 may provide other common services for the other software layers. The drivers 2032 may be responsible for controlling or interfacing with the underlying hardware. For instance, the drivers 2032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 2016 may provide a common infrastructure that may be utilized by the applications 2020 and/or other components and/or layers. The libraries 2016 typically provide functionality that allows other software modules to perform tasks in an easier fashion than to interface directly with the underlying operating system 2014 functionality (e.g., kernel 2028, services 2030, and/or drivers 2032). The libraries 2016 may include system libraries 2034 (e.g., C standard library) that may provide functions such as memory allocation functions, string manipulation functions, mathematic functions, and the like. In addition, the libraries 2016 may include API libraries 2036 such as media libraries (e.g., libraries to support presentation and manipulation of various media formats such as moving picture experts group (MPEG) 4, H.264, MPEG-1 or MPEG-2 Audio Layer (MP3), AAC, AMR, joint photography experts group (PG), or portable network graphics (PNG)), graphics libraries (e.g., an Open Graphics Library (OpenGL) framework that may be used to render 2D and 3D graphic content on a display), database libraries (e.g., Structured Query Language (SQL), SQLite that may provide various relational database functions), web libraries (e.g., WebKit that may provide web browsing functionality), and the like. The libraries 2016 may also include a wide variety of other libraries 2038 to provide many other APIs to the applications 2020 and other software components/modules.

The frameworks 2018 (also sometimes referred to as middleware) may provide a higher-level common infrastructure that may be utilized by the applications 2020 and/or other software components/modules. For example, the frameworks/middleware 2018 may provide various graphic user interface (GUI) functions, high-level resource management, high-level location services, and so forth. The frameworks/middleware 2018 may provide a broad spectrum of other APIs that may be utilized by the applications 2020 and/or other software components/modules, some of which may be specific to a particular operating system 2014 or platform.

The applications 2020 include built-in applications 2040 and/or third-party applications 2042. Examples of representative built-in applications 2040 may include, but are not limited to, a contacts application, a browser application, a book reader application, a location application, a media application, a messaging application, and/or a game application. Third-party applications 2042 may include any of the built-in applications as well as a broad assortment of other applications 2020. In a specific example, the third-party application 2042 (e.g., an application developed using the Android™ or iOS™ software development kit (SDK) by an entity other than the vendor of the particular platform) may be mobile software running on a mobile operating system 2014 such as iOS™, Android™, Windows® Phone, or other mobile operating systems 2014. In this example, the third-party application 2042 may invoke the API calls 2024 provided by the mobile operating system such as the operating system 2014 to facilitate functionality described herein.

The applications 2020 may utilize built-in operating system functions (e.g., kernel 2028, services 2030, and/or drivers 2032), libraries (e.g., system libraries 2034, API libraries 2036, and other libraries 2038), and frameworks/middleware 2018 to create user interfaces to interact with users of the system. Alternatively, or additionally, in sonic systems, interactions with a user may occur through a presentation layer, such as the presentation layer 2044. In these systems, the application/module "logic" can be separated from the aspects of the application/module that interact with a user.

Some software architectures 2002 utilize virtual machines. In the example of FIG. 11, this is illustrated by a virtual machine 2048. The virtual machine 2048 creates a software environment where applications/modules can execute as if they were executing on a hardware machine (such as the machine 2100 of FIG. 12, for example). The virtual machine 2048 is hosted by a host operating system (e.g., operating system 2014 in FIG. 11) and typically, although not always, has a virtual machine monitor 2046, which manages the operation of the virtual machine 2048 as well as the interface with the host operating system (e.g., operating system 2014). A software architecture executes within the virtual machine 2048, such as an operating system 2050, libraries 2052, frameworks/middleware 2054, applications 2056, and/or a presentation layer 2058. These layers of software architecture executing within the virtual machine 2048 can be the same as corresponding layers previously described or may be different.

Example Machine Architecture and Machine-Storage Medium

Figure 12:
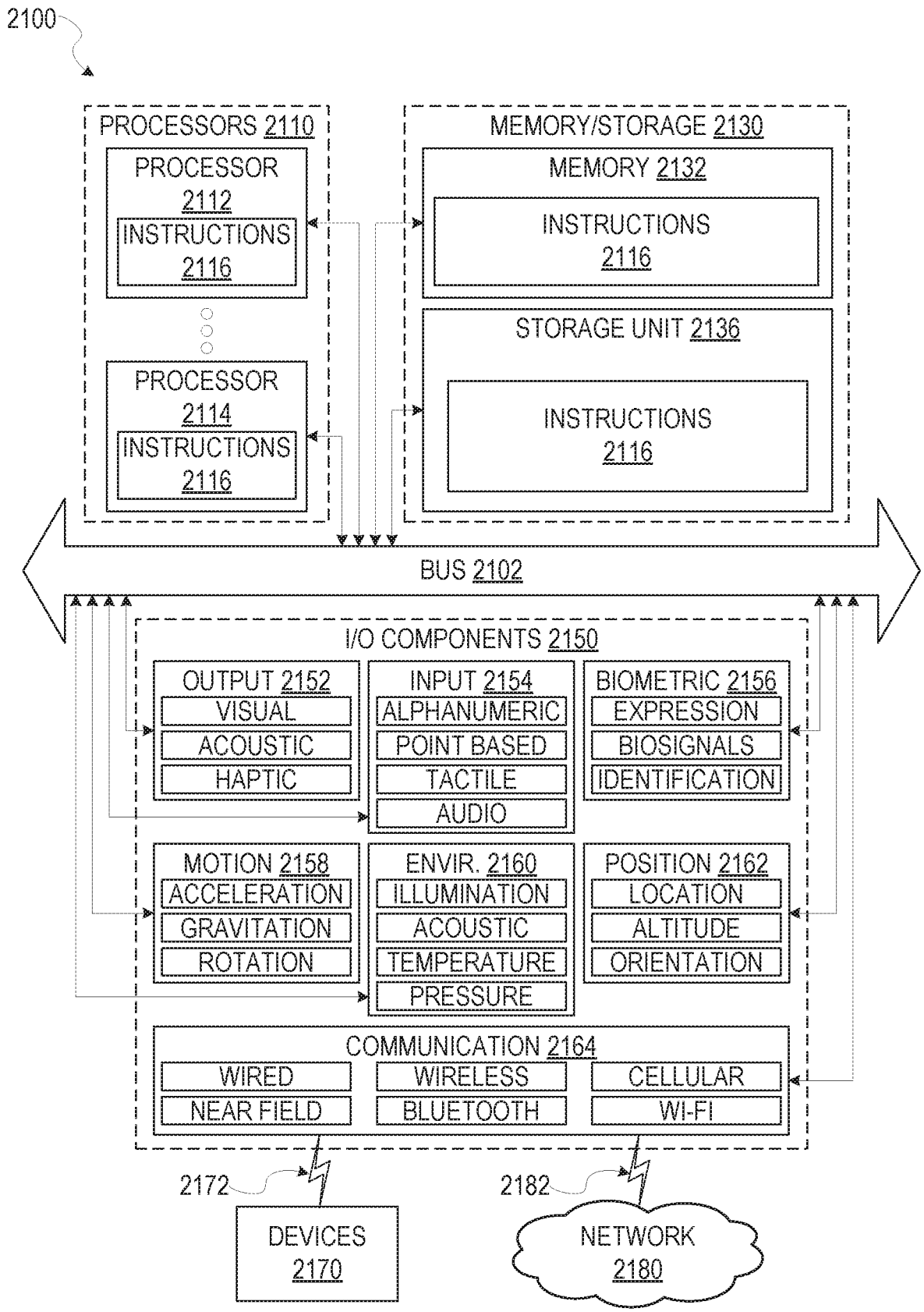
FIG. 12 is a block diagram illustrating components of a machine, according to some example embodiments.

FIG. 12 is a block diagram illustrating components of a machine 2100, according to some example embodiments, able to read instructions from a machine-storage medium and perform any one or more of the methodologies discussed herein. Specifically, FIG. 12 shows a diagrammatic representation of the machine 2100 in the example form of a computer system, within which instructions 2116 (e.g., software, a program, an application, an apples, an app, or other executable code) for causing the machine 2100 to perform any one or more of the methodologies discussed herein may be executed. For example, the instructions 2116 may cause the machine 2100 to execute the flow diagrams of FIGS. 4A, 4B, 8A, 8B and 8C. Additionally, or alternatively, the instructions 2116 may implement the modules, engines, applications, and so forth, as described in this document. The instructions 2116 transform the general, non-programmed machine 2100 into a particular machine 2100 programmed to carry out the described and illustrated functions in the manner described. In alternative embodiments, the machine 2100 operates as a standalone device or may be coupled (e.g., networked) to other machines 2100. In a networked deployment, the machine 2100 may operate in the capacity of a server machine or a client machine in a server-client network environment, or as a peer machine in a peer-to-peer (or distributed) network environment. The machine 2100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 2100 capable of executing the instructions 2116, sequentially or otherwise, that specify actions to be taken by the machine 2100. Further, while only a single machine 2100 is illustrated, the term "machine" shall also be taken to include a collection of machines 2100 that individually or jointly execute the instructions 2116 to perform any one or more of the methodologies discussed herein.

The machine 2100 may include processors 2110, memory/storage 2130, and I/O components 2150, which may be configured to communicate with each other such as via a bus 2102. In an example embodiment, the processors 2110 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (MC), another processor, or any suitable combination thereof) may include, for example, a processor 2112 and a processor 2114 that may execute the instructions 2116. The term "processor" is intended to include multi-core processors 2110 that may comprise two or more independent processors 2110 (sometimes referred to as "cores") that may execute the instructions 2116 contemporaneously. Although FIG. 12 shows multiple processors 2110, the machine 2100 may include a single processor 2110 with a single core, a single processor 2110 with multiple cores (e.g., a multi-core processor), multiple processors 2110 with a single core, multiple processors 2110 with multiples cores, or any combination thereof.

The memory/storage 2130 may include a memory 2132, such as a main memory, or other memory storage, and a storage unit 2136, both accessible to the processors 2110 such as via the bus 2102. The storage unit 2136 and memory 2132 store the instructions 2116, embodying any one or more of the methodologies or functions described herein. The instructions 2116 may also reside, completely or partially, within the memory 2132, within the storage unit 2136, within at least one of the processors 2110 (e.g., within the processor's cache memory), or any suitable combination thereof, during execution thereof by the machine 2100. Accordingly, the memory 2132, the storage unit 2136, and the memory of the processors 2110 are examples of machine-storage media.

As used herein, "machine-storage medium" means a device able to store the instructions 2116 and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-storage medium" should be taken to include a single medium or multiple media (e.g., a centralized or distributed database, or associated caches and servers) able to store the instructions 2116. The term "machine-storage medium" shall also be taken to include any medium, or combination of multiple media, that is capable of storing instructions (e.g., instructions 2116) for execution by a machine (e.g., machine 2100), such that the instructions 2116, when executed by one or more processors of the machine (e.g., processors 2110), cause the machine to perform any one or more of the methodologies described herein. Accordingly, a "machine-storage medium" refers to a single storage apparatus or device, as well as "cloud-based" storage systems or storage networks that include multiple storage apparatus or devices. The term "machine-storage medium" excludes signals per se.

The I/O components 2150 may include a wide variety of components to receive input, provide output, produce output, transmit information, exchange information, capture measurements, and so on. The specific I/O components 2150 that are included in a particular machine 2100 will depend on the type of machine. For example, portable machines 2100 such as mobile phones will likely include a touch input device or other such input mechanisms, while a headless server machine will likely not include such a touch input device. It will be appreciated that the I/O components 2150 may include many other components that are not shown in FIG. 12. The I/O components 2150 are grouped according to functionality merely for simplifying the following discussion and the grouping is in no way limiting. In various example embodiments, the I/O components 2150 may include output components 2152 and input components 2154. The output components 2152 may include visual components a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 2150 may include biometric components 2156, motion components 2158, environmental components 2160, or position components 2162 among a wide array of other components. For example, the biometric components 2156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2158 may include acceleration sensor components (e.g., accelerometer), gravitation sensor components, rotation sensor components (e.g., gyroscope), and so forth. The environmental components 2160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 2162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2150 may include communication components 2164 operable to couple the machine 2100 to a network 2180 or devices 2170 via a coupling 2182 and a coupling 2172 respectively. For example, the communication components 2164 may include a network interface component or other suitable device to interface with the network 2180. In further examples, the communication components 2164 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 2170 may be another machine 2100 or any of a wide variety of peripheral devices (e.g., a peripheral device coupled via a USB).

Moreover, the communication components 2164 may detect identifiers or include components operable to detect identifiers. For example, the communication components 2164 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2164, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 2180 may be an ad hoc network, an intranet, an extranet, a virtual private network (VPN), a local area network (LAN), a wireless LAN (WEAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 2180 or a portion of the network 2180 may include a wireless or cellular network and the coupling 2182 may be a Code Division Multiple Access (CDMA) connection, a Global System for Mobile communications (GSM) connection, or another type of cellular or wireless coupling. In this example, the coupling 2182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 2116 may be transmitted or received over the network 2180 using a transmission medium via a network interface device (e.g., a network interface component included in the communication components 2164) and utilizing any one of a number of well-known transfer protocols (e.g., hypertext transfer protocol (HTTP)). Similarly, the instructions 2116 may be transmitted or received using a transmission medium via the coupling 2172 (e.g., a peer-to-peer coupling) to the devices 2170.

Signal Medium

The term "signal medium" or "transmission medium" shall be taken to include any intangible medium that is capable of storing, encoding, or carrying the instructions 2116 for execution by the machine 2100, and includes digital or analog communications signals or other intangible media to facilitate communication of such software.

Machine-Readable Medium

The terms "machine-readable medium," "computer-readable medium" and "device-readable medium" mean the same thing and may be used interchangeably in this disclosure. The terms are defined to include both machine-storage media and transmission medium. Thus, the terms include both storage devices/media and carrier waves/modulated data signals.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject flatter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A system comprising:
   at least one processor and memory having instructions executable by the at least one processor to cause the system to:
   receive a plurality of read requests to read snapshot information, the plurality of read requests being received from a job that is repeatedly executed, each of the plurality of read requests including an offset and a length, the offset identifying a storage location, the length being added to the storage location to identify a range of one or more storage locations, the snapshot information including a plurality of snapshots including a full snapshot and at least one incremental snapshot of a production machine;
   generate a count of one or more duplicate reads of data from the one or more storage locations based on the plurality of read requests; and
   identify whether utilizing a cache optimizes the job based on the count of the one or more duplicate reads of data.

2. The system of claim 1, wherein:
   the offset identifies the storage location,
   the one or more storage locations including at least one storage location,
   the full snapshot is of the production machine,
   the plurality of read requests include a first read request to read data from the snapshot information, and
   the instructions are further executable by the at least one processor to cause the system to:
   generate a first plurality of read events based on the plurality of read requests, the first plurality of read events including a second plurality of read events, the second plurality of read events being generated by processing the first read request, the second plurality of read events including at least two read events including a first read event and a second read event, the first read event corresponds to a reading a first portion of the data from a first snapshot of the plurality of snapshots, the second read event corresponds to reading a second portion of the data from a second snapshot of the plurality of snapshots, the first snapshot and the second snapshot being different snapshots;
   identify duplicate read events based on the first plurality of read events; and
   aggregate the duplicate read events to generate at least one count of aggregated duplicate read events for the plurality of snapshots, wherein identifying whether utilizing the cache optimizes the job based on the first plurality of read events includes identifying the cache optimizes the job based on the at least one count of aggregated duplicate read events for the plurality of snapshots.

3. The system of claim 2, wherein the plurality of snapshots includes snapshots that respectively correspond to snapshot levels and snapshot level identifiers.

4. The system of claim 2, wherein the at least one count of aggregated duplicate read events for the plurality of snapshots includes a count of aggregated duplicate read events for a base snapshot.

5. The system of claim 2, wherein the at least one count of aggregated duplicate read events for the plurality of snapshots includes a count of aggregated duplicate read events for an incremental snapshot.

6. The system of claim 2, wherein, to identify whether utilizing a cache optimizes the job based on the first plurality of read events, the instructions are further executable by the at least one processor to cause the system to:
   compare a percentage of duplicate reads with a predetermined threshold.

7. The system of claim 6, wherein, to compare the percentage of duplicate reads with the predetermined threshold, the instructions are further executable by the at least one processor to cause the system to:
   utilize a bloom filter.

8. The system of claim 2, wherein, to identify whether utilizing a cache optimizes the job based on the first plurality of read events, the instructions are further executable by the at least one processor to cause the system to:
   compare a percentage of early reads with a predetermined threshold.

9. The system of claim 2, wherein the first read request includes a first offset and a first length and wherein the first read event includes the first offset and a second length and wherein the second read event includes a third offset and a third length.

10. A method comprising:
    receiving a plurality of read requests to read snapshot information, the plurality of read requests being received from a job that is repeatedly executed, each of the plurality of read requests including an offset and a length, the offset identifying a storage location, the length being added to the storage location to identify a range of one or more storage locations, the snapshot information including a plurality of snapshots including a full snapshot and at least one incremental snapshot of a production machine;
    generating a count of one or more duplicate reads of data from the one or more storage locations based on the plurality of read requests; and
    identifying whether utilizing a cache optimizes the job based on the count of the one or more duplicate reads of data.

11. The method of claim 10, wherein:
    the offset identifies the storage location,
    the one or more storage locations including at least one storage location,
    the full snapshot is of the production machine,
    the plurality of read requests include a first read request to read data from the snapshot information, and the method further comprises:
  generating a first plurality of read events based on the plurality of read requests, the first plurality of read events including a second plurality of read events, the second plurality of read events being generated by processing the first read request, the second plurality of read events including at least two read events including a first read event and a second read event, the first read event corresponds to a reading a first portion of the data from a first snapshot of the plurality of snapshots, the second read event corresponds to reading a second portion of the data from a second snapshot of the plurality of snapshots, the first snapshot and the second snapshot being different snapshots;
  identifying duplicate read events based on the first plurality of read events; and
  aggregating the duplicate read events to generate at least one count of aggregated duplicate read events for the plurality of snapshots, wherein identifying whether utilizing the cache optimizes the job based on the first plurality of read events includes identifying the cache optimizes the job based on the at least one count of aggregated duplicate read events for the plurality of snapshots.

12. The method of claim 11, wherein the plurality of snapshots includes snapshots that respectively correspond to snapshot levels and snapshot level identifiers.

13. The method of claim 11, wherein the at least one count of aggregated duplicate read events for the plurality of snapshots includes a count of aggregated duplicate read events for a base snapshot.

14. The method of claim 11, wherein the at least one count of aggregated duplicate read events for the plurality of snapshots includes a count of aggregated duplicate read events for an incremental snapshot.

15. The method of claim 11, wherein identifying whether utilizing a cache optimizes the job based on the first plurality of read events includes comparing a percentage of duplicate reads with a predetermined threshold.

16. The method of claim 15, wherein comparing the percentage of duplicate reads with the predetermined threshold includes utilizing a bloom filter.

17. The method of claim 11, wherein identifying whether utilizing a cache optimizes the job based on the first plurality of read events includes comparing a percentage of early reads with a predetermined threshold.

18. The method of claim 11, wherein the first read request includes a first offset and a first length and wherein the first read event includes the first offset and a second length and wherein the second read event includes a third offset and a third length.

19. A non-transitory, computer-readable medium storing instructions executable by a processor to:
  receive a plurality of read requests to read snapshot information, the plurality of read requests being received from a job that is repeatedly executed, each of the plurality of read requests including an offset and a length, the offset identifying a storage location, the length being added to the storage location to identify a range of one or more storage locations, the snapshot information including a plurality of snapshots including a full snapshot and at least one incremental snapshot of a production machine;
  generate a count of one or more duplicate reads of data from the one or more storage locations based on the plurality of read requests; and
  identify whether utilizing a cache optimizes the job based on the count of the one or more duplicate reads of data.

20. The non-transitory, computer-readable medium of claim 19, wherein:
  the offset identifies the storage location,
  the one or more storage locations including at least one storage location,
  the full snapshot is of the production machine,
  the plurality of read requests include a first read request to read data from the snapshot information, and
  the instructions are further executable by the processor to:
    generate a first plurality of read events based on the plurality of read requests, the first plurality of read events including a second plurality of read events, the second plurality of read events being generated by processing the first read request, the second plurality of read events including at least two read events including a first read event and a second read event, the first read event corresponds to a reading a first portion of the data from a first snapshot of the plurality of snapshots, the second read event corresponds to reading a second portion of the data from a second snapshot of the plurality of snapshots, the first snapshot and the second snapshot being different snapshots;
    identify duplicate read events based on the first plurality of read events; and
    aggregate the duplicate read events to generate at least one count of aggregated duplicate read events for the plurality of snapshots, wherein identifying whether utilizing the cache optimizes the job based on the first plurality of read events includes identifying the cache optimizes the job based on the at least one count of aggregated duplicate read events for the plurality of snapshots.

\* \* \* \* \*